(12) United States Patent
Morita et al.

(10) Patent No.: US 8,254,472 B2
(45) Date of Patent: Aug. 28, 2012

(54) COMMUNICATION DEVICE AND COMMUNICATION SYSTEM

(75) Inventors: Noboru Morita, Kawasaki (JP); Michio Hibi, Kawasaki (JP); Manabu Yamazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 284 days.

(21) Appl. No.: 12/697,677

(22) Filed: Feb. 1, 2010

(65) Prior Publication Data
US 2010/0128763 A1 May 27, 2010

Related U.S. Application Data

(63) Continuation of application No. PCT/JP2007/065263, filed on Aug. 3, 2007.

(51) Int. Cl.
*H04L 27/00* (2006.01)
(52) U.S. Cl. ............... 375/259; 375/224; 375/296
(58) Field of Classification Search ............ 375/296, 375/285, 229, 350, 221, 224, 226, 259
See application file for complete search history.

(56) References Cited

U.S. PATENT DOCUMENTS

| | | | | |
|---|---|---|---|---|
| 5,402,444 | A * | 3/1995 | Saito | 375/229 |
| 6,208,686 | B1 * | 3/2001 | McDonald et al. | 375/219 |
| 7,245,657 | B2 * | 7/2007 | Yanai | 375/226 |
| 7,450,636 | B2 | 11/2008 | Lee et al. | |
| 7,586,987 | B2 * | 9/2009 | Vorenkamp et al. | 375/257 |
| 7,733,967 | B2 | 6/2010 | Yamazaki | |
| 7,787,536 | B2 * | 8/2010 | Chou | 375/232 |
| 2002/0063934 | A1 | 5/2002 | Sakauchi | |
| 2003/0112241 | A1 * | 6/2003 | Fernando | 345/440 |
| 2004/0071219 | A1 * | 4/2004 | Vorenkamp et al. | 375/257 |
| 2004/0125874 | A1 * | 7/2004 | Baumert | 375/226 |
| 2007/0018637 | A1 * | 1/2007 | Kim et al. | 324/158.1 |
| 2007/0041454 | A1 | 2/2007 | Yamazaki | |
| 2009/0141787 | A1 * | 6/2009 | Wong et al. | 375/231 |

FOREIGN PATENT DOCUMENTS

| | | |
|---|---|---|
| JP | 11-510901 | 9/1999 |
| JP | 2000-059308 | 2/2000 |
| JP | 2001-339315 | 12/2001 |
| JP | 2002-164846 | 6/2002 |
| JP | 2004-104781 | 4/2004 |
| JP | 2004-194028 | 7/2004 |
| JP | 2004-357050 | 12/2004 |
| JP | 2005-286952 | 10/2005 |
| JP | 2007-053648 | 3/2007 |
| JP | 2007-53648 | 3/2007 |
| WO | 97/45713 | 12/1997 |

OTHER PUBLICATIONS

Japanese Office Action issued Aug. 17, 2010 in corresponding Japanese Patent Application 2009-526274.
International Search Report for PCT/JP2007/065263, mailed Oct. 16, 2007.
Written Opinion of International Searching Authority.
Written Opinion of International Searching Authority mailed on Oct. 16, 2007.

* cited by examiner

*Primary Examiner* — Jean B Corrielus
(74) *Attorney, Agent, or Firm* — Staas & Halsey LLP

(57) ABSTRACT

A communication device includes a storage unit that stores a predetermined eye mask pattern indicating a receivable range, a receiving unit that receives data from the other communication device, a waveform comparing unit for comparing a waveform of the received data with the eye mask pattern to generate comparison result data and a transmission unit for transmitting the comparison result data to the other communication device.

8 Claims, 23 Drawing Sheets

FIG.6A

| | $-\Delta\phi5$ | $-\Delta\phi4$ $-\Delta\phi5$ | $-\Delta\phi3$ $-\Delta\phi4$ | $-\Delta\phi2$ $-\Delta\phi3$ | $-\Delta\phi1$ $-\Delta\phi2$ | CLK | $+\Delta\phi1$ $+\Delta\phi2$ | $+\Delta\phi2$ $+\Delta\phi3$ | $+\Delta\phi3$ $+\Delta\phi4$ | $+\Delta\phi4$ $+\Delta\phi5$ |
|---|---|---|---|---|---|---|---|---|---|---|
| >V14 | 0 | 0 | 0 | 0 | 0 | 0 | 0 | 0 | 0 | 0 |
| >V13 | 0 | 0 | 0 | 0 | 0 | 0 | 0 | 0 | 0 | 0 |
| >V12 | 0 | 0 | 0 | 0 | 0 | 0 | 0 | 0 | 0 | 0 |
| >V11 | 0 | 0 | 0 | 0 | 0 | 0 | 0 | 0 | 0 | 0 |
| >V10 | 0 | 0 | 0 | 0 | 0 | 1 | 0 | 0 | 0 | 0 |
| >V9 | 0 | 0 | 0 | 0 | 1 | 1 | 1 | 0 | 0 | 0 |
| >V8 | 0 | 0 | 0 | 0 | 1 | 1 | 1 | 1 | 0 | 0 |
| >V7 | 0 | 0 | 1 | 1 | 1 | 1 | 1 | 1 | 1 | 0 |
| >V6 | 0 | 1 | 1 | 1 | 1 | 1 | 1 | 1 | 1 | 0 |
| >V5 | 0 | 1 | 1 | 1 | 1 | 1 | 1 | 1 | 1 | 1 |
| >V4 | 1 | 1 | 1 | 1 | 1 | 1 | 1 | 1 | 1 | 1 |
| >V3 | 1 | 1 | 1 | 1 | 1 | 1 | 1 | 1 | 1 | 1 |
| >V2 | 1 | 1 | 1 | 1 | 1 | 1 | 1 | 1 | 1 | 1 |
| >V1 | 1 | 1 | 1 | 1 | 1 | 1 | 1 | 1 | 1 | 1 |
| ≤V1 | 1 | 1 | 1 | 1 | 1 | 1 | 1 | 1 | 1 | 1 |

FIG.6B

| | $-\Delta\phi5$ | $-\Delta\phi4-\Delta\phi3$ | $-\Delta\phi3-\Delta\phi2-\Delta\phi1$ | CLK | $+\Delta\phi1+\Delta\phi2$ | $+\Delta\phi2+\Delta\phi3$ | $+\Delta\phi3+\Delta\phi4$ | $+\Delta\phi4+\Delta\phi5$ |
|---|---|---|---|---|---|---|---|---|
| >V14 | 0 | 0 | 0 | 0 | 0 | 0 | 0 | 0 |
| >V13 | 0 | 0 | 0 | 0 | 0 | 0 | 0 | 0 |
| >V12 | 0 | 0 | 0 | 0 | 0 | 0 | 0 | 0 |
| >V11 | 0 | 0 | 0 | 0 | 0 | 0 | 0 | 0 |
| >V10 | 0 | 0 | 0 | 0 | 0 | 0 | 0 | 0 |
| >V9 | 1 | 0 | 0 | 0 | 0 | 0 | 0 | 0 |
| >V8 | 1 | 1 | 0 | 0 | 0 | 0 | 0 | 0 |
| >V7 | 1 | 1 | 0 | 0 | 0 | 0 | 0 | 0 |
| >V6 | 1 | 1 | 1 | 0 | 0 | 0 | 0 | 0 |
| >V5 | 1 | 1 | 1 | 0 | 0 | 0 | 0 | 0 |
| >V4 | 1 | 1 | 1 | 1 | 0 | 0 | 0 | 0 |
| >V3 | 1 | 1 | 1 | 1 | 1 | 1 | 0 | 0 |
| >V2 | 1 | 1 | 1 | 1 | 1 | 1 | 1 | 0 |
| >V1 | 1 | 1 | 1 | 1 | 1 | 1 | 1 | 1 |
| ≦V1 | 1 | 1 | 1 | 1 | 1 | 1 | 1 | 1 |

FIG.7

|  |  | a0 | a1 | a2 | a3 | a4 | a5 | a6 | a7 | a8 | a9 | a10 |
|---|---|---|---|---|---|---|---|---|---|---|---|---|
|  |  | 0 |  |  | X1 |  | X2 |  | 1-X1 |  |  | 1 |

FIG.8A

| Pos | Neg | Q |
|-----|-----|---|
| 0 | 0 | 0 |
| 0 | 1 | 1 |
| 1 | 0 | 1 |
| 1 | 1 | 0 |

FIG.8B

| | B14 | B13 | B12 | B11 | B10 | B9 | B8 | B7 | B6 | B5 | B4 | B3 | B2 | B1 | B0 |
|---|---|---|---|---|---|---|---|---|---|---|---|---|---|---|---|
| a10 | 0 | 0 | 0 | 0 | 0 | 1 | 1 | 1 | 1 | 0 | 0 | 0 | 0 | 0 | 0 |
| a9 | 0 | 0 | 0 | 0 | 0 | 0 | 0 | 1 | 0 | 0 | 0 | 0 | 0 | 0 | 0 |
| a8 | 0 | 0 | 0 | 0 | 0 | 0 | 1 | 1 | 1 | 0 | 0 | 0 | 0 | 0 | 0 |
| a7 | 0 | 0 | 0 | 0 | 0 | 1 | 1 | 1 | 1 | 1 | 0 | 0 | 0 | 0 | 0 |
| a6 | 0 | 0 | 0 | 0 | 1 | 1 | 1 | 1 | 1 | 1 | 0 | 0 | 0 | 0 | 0 |
| a5 | 0 | 0 | 0 | 1 | 1 | 1 | 1 | 1 | 1 | 1 | 1 | 0 | 0 | 0 | 0 |
| a4 | 0 | 0 | 0 | 0 | 1 | 1 | 1 | 1 | 1 | 1 | 0 | 0 | 0 | 0 | 0 |
| a3 | 0 | 0 | 0 | 0 | 0 | 1 | 1 | 1 | 1 | 0 | 0 | 0 | 0 | 0 | 0 |
| a2 | 0 | 0 | 0 | 0 | 0 | 0 | 1 | 1 | 1 | 0 | 0 | 0 | 0 | 0 | 0 |
| a1 | 0 | 0 | 0 | 0 | 0 | 0 | 1 | 0 | 0 | 0 | 0 | 0 | 0 | 0 | 0 |
| a0 | 0 | 0 | 0 | 0 | 0 | 1 | 1 | 1 | 1 | 0 | 0 | 0 | 0 | 0 | 0 |

FIG.9A

| Qb+1 | Qb | Qb−1 | S |
|---|---|---|---|
| 0 | 0 | 0 | 1 |
| 0 | 0 | 1 | 1 |
| 0 | 1 | 0 | 1 |
| 0 | 1 | 1 | 1 |
| 1 | 0 | 0 | 1 |
| 1 | 0 | 1 | 1 |
| 1 | 1 | 0 | 1 |
| 1 | 1 | 1 | 0 |

FIG.9B

| Qb | S | T |
|---|---|---|
| 0 | 0 | 0 |
| 0 | 1 | 0 |
| 1 | 0 | 0 |
| 1 | 1 | 1 |

FIG.9C

| | a0 | a1 | a2 | a3 | a4 | a5 | a6 | a7 | a8 | a9 | a10 |
|---|---|---|---|---|---|---|---|---|---|---|---|
| B14 | 0 | 0 | 0 | 0 | 0 | 0 | 0 | 0 | 0 | 0 | 0 |
| B13 | 0 | 0 | 0 | 0 | 0 | 0 | 0 | 0 | 0 | 0 | 0 |
| B12 | 0 | 0 | 0 | 0 | 0 | 0 | 0 | 0 | 0 | 0 | 0 |
| B11 | 0 | 0 | 0 | 0 | 0 | 0 | 0 | 0 | 0 | 0 | 0 |
| B10 | 0 | 0 | 0 | 0 | 0 | 0 | 0 | 0 | 0 | 0 | 1 |
| B9  | 1 | 0 | 0 | 0 | 0 | 0 | 0 | 1 | 0 | 1 | 0 |
| B8  | 0 | 0 | 1 | 1 | 1 | 0 | 0 | 0 | 1 | 0 | 0 |
| B7  | 0 | 1 | 0 | 0 | 0 | 0 | 0 | 1 | 0 | 1 | 0 |
| B6  | 0 | 0 | 1 | 1 | 0 | 0 | 0 | 0 | 1 | 0 | 0 |
| B5  | 1 | 0 | 0 | 0 | 1 | 1 | 1 | 0 | 0 | 0 | 1 |
| B4  | 0 | 0 | 0 | 0 | 0 | 0 | 0 | 0 | 0 | 0 | 0 |
| B3  | 0 | 0 | 0 | 0 | 0 | 0 | 0 | 0 | 0 | 0 | 0 |
| B2  | 0 | 0 | 0 | 0 | 0 | 0 | 0 | 0 | 0 | 0 | 0 |
| B1  | 0 | 0 | 0 | 0 | 0 | 0 | 0 | 0 | 0 | 0 | 0 |
| B0  | 0 | 0 | 0 | 0 | 0 | 0 | 0 | 0 | 0 | 0 | 0 |

FIG.10

| | B14 | B13 | B12 | B11 | B10 | B9 | B8 | B7 | B6 | B5 | B4 | B3 | B2 | B1 | B0 |
|---|---|---|---|---|---|---|---|---|---|---|---|---|---|---|---|
| a10 | 1 | 1 | 0 | 0 | 0 | 1 | 0 | 0 | 0 | 1 | 0 | 0 | 0 | 1 | 1 |
| a9 | 1 | 1 | 0 | 0 | 0 | 0 | 0 | 1 | 0 | 0 | 0 | 0 | 0 | 1 | 1 |
| a8 | 1 | 1 | 0 | 0 | 0 | 0 | 1 | 0 | 1 | 0 | 0 | 0 | 0 | 1 | 1 |
| a7 | 1 | 1 | 0 | 0 | 0 | 1 | 0 | 1 | 0 | 1 | 0 | 0 | 0 | 1 | 1 |
| a6 | 1 | 1 | 1 | 0 | 0 | 1 | 0 | 1 | 1 | 1 | 0 | 1 | 0 | 1 | 1 |
| a5 | 1 | 1 | 1 | 0 | 1 | 0 | 1 | 1 | 1 | 1 | 1 | 0 | 1 | 1 | 1 |
| a4 | 1 | 1 | 1 | 0 | 0 | 1 | 0 | 1 | 1 | 1 | 0 | 0 | 0 | 1 | 1 |
| a3 | 1 | 1 | 0 | 0 | 0 | 1 | 0 | 1 | 0 | 1 | 0 | 0 | 0 | 1 | 1 |
| a2 | 1 | 1 | 0 | 0 | 0 | 0 | 1 | 0 | 1 | 0 | 0 | 0 | 0 | 1 | 1 |
| a1 | 1 | 1 | 0 | 0 | 0 | 0 | 0 | 1 | 0 | 0 | 0 | 0 | 0 | 1 | 1 |
| a0 | 1 | 1 | 0 | 0 | 0 | 1 | 0 | 0 | 0 | 1 | 0 | 0 | 0 | 1 | 1 |

COMMUNICATION DEVICE AND COMMUNICATION SYSTEM

CROSS-REFERENCE TO RELATED APPLICATIONS

This is a continuation of Application PCT/JP2007/065263, filed on Aug. 3, 2007, the entire contents of which are incorporated herein by reference.

FIELD

The embodiments discussed herein are related to a communication device, a communication system and a communication method.

BACKGROUND

With the recent increase in the data bandwidth handled by systems, serial interfaces with a speed as high as the gigabit per second (Gbps) level have been put into practice as interfaces between information processing apparatuses, and have become widespread. For example, fibre channel interfaces, serial advanced technology attachment (SATA) interfaces, and the like have become available.

In transmission systems based on high-speed serial interfaces, when the transmission distance is long and if values of a driver during transmission such as an amplitude value and an emphasis value indicating the degree of emphasis in the high-frequency range of the transmission waveform are used with values unchanged from the initial values, the transmission amplitude may be insufficient. Conversely, when the transmission distance is short, the transmission amplitude may be excessive. That is, the installation environment may differ depending on the system used. Therefore, it is preferable to reset the settings of the driver and the like to values that are optimum for the system in terms of the transmission state. Optimum values of the individual parameters are calculated by performing a transmission simulation, impractical calculation of transmission loss, or the like in advance. During inspection before shipment of the devices, the values are actually set in the devices and received waveforms are observed to make sure that no transmission errors occur. Thereafter, the finally determined values are set as fixed values and set in the devices before shipment.

[Patent Document 1] Japanese Laid-open Patent Publication No. 2007-53648

SUMMARY

According to an aspect of the invention, a communication device includes a storage unit that stores a predetermined eye mask pattern indicating a receivable range, a receiving unit that receives data from the other communication device, a waveform comparing unit for comparing a waveform of the received data with the eye mask pattern to generate comparison result data and a transmission unit for transmitting the comparison result data to the other communication device.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIGS. 6A and 6B are diagrams illustrating received waveform data.
FIG. 7 is a second diagram illustrating an eye mask pattern.
FIGS. 8A and 8B are first diagrams illustrating superposition of the received waveform.
FIGS. 9A, 9B, and 9C are second diagrams illustrating superposition of the received waveform.
FIG. 10 is a diagram illustrating superposition of the eye mask pattern and the received waveform.

DESCRIPTION OF EMBODIMENT

Figure 1:
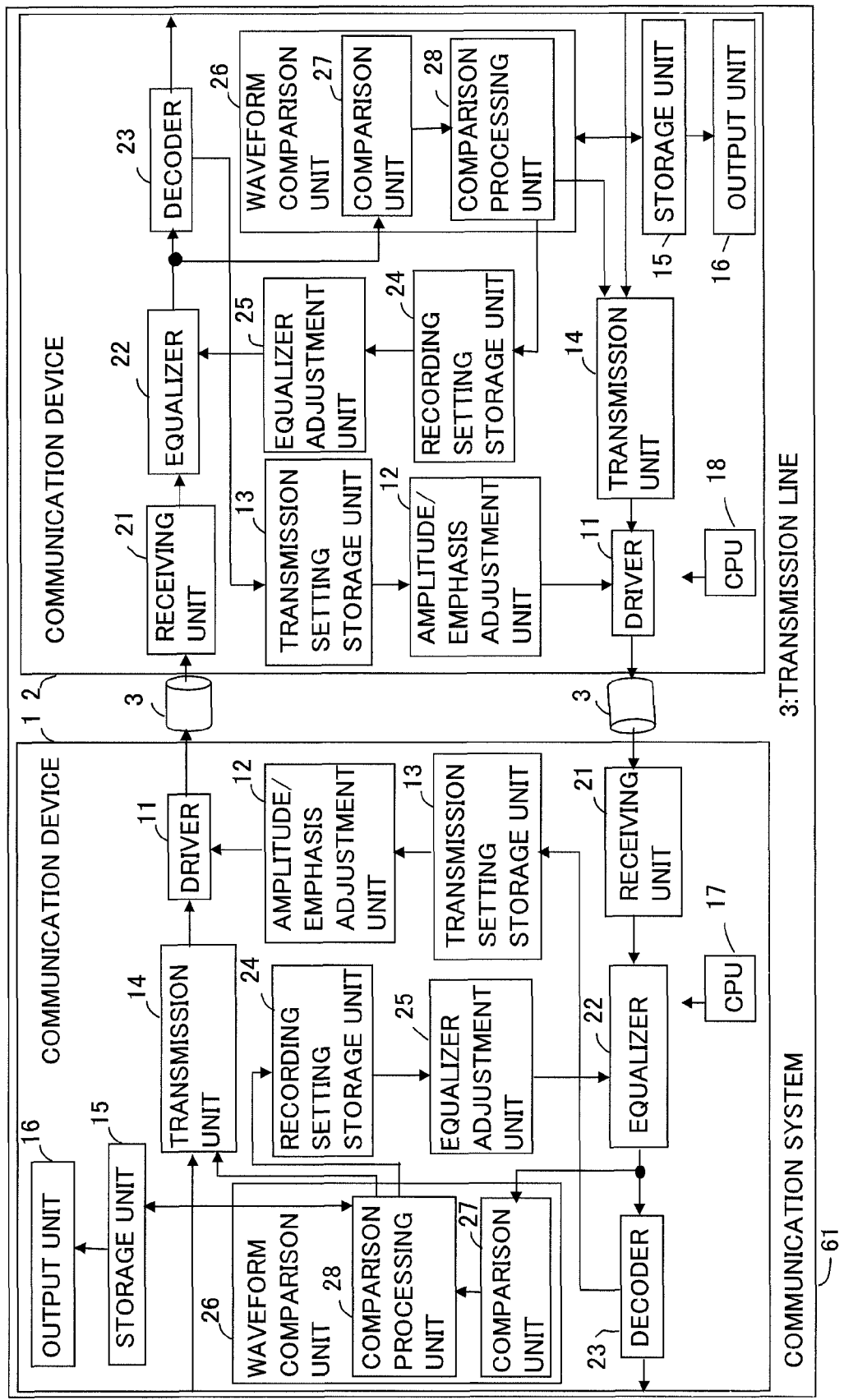
FIG. 1 is a block diagram of a communication system.

FIG. 1 is a block diagram of a communication system 61. The communication system 61 includes communication devices 1 and 2, and a transmission line 3.

Each of the communication devices 1 and 2 includes a driver 11, an amplitude/emphasis adjustment unit 12 (corresponding to setting unit described in claims), a transmission setting storage unit 13, a transmission unit 14, a storage unit 15, an output unit 16, a receiving unit 21, an equalizer 22, a decoder 23, a reception setting storage unit 24, an equalizer adjustment unit 25, and a waveform comparing unit 26. The waveform comparing unit 26 includes a comparison unit 27 and a comparison processing unit 28. The communication devices 1 and 2 further include CPUs (central processing units) 17 and 18, respectively.

The driver 11 has a differential output terminal (not illustrated) which is connected to a differential input terminal of the receiving unit 21 of the communication device 1 or 2 as the connection destination, via the transmission line 3 for transmitting transmission data. The amplitude/emphasis adjustment unit 12 adjusts the amplitude value and emphasis value, which are the output characteristics of the driver 11. The adjustment is performed by referring to data stored in the transmission setting storage unit 13 in accordance with correction instruction data or the like indicating an instruction for changing the output characteristics of the driver 11, which is sent from the communication device 1 or 2 as the connection destination. The adjustment of the emphasis value may be to emphasize a high-frequency component in the output frequency characteristic of the driver 11, for example. The transmission setting storage unit 13 stores values to be set in the driver 11, such as a set value of amplitude and a set value of emphasis (hereinafter referred to as an "EN value"). The transmission unit 14 performs a process of sending a test pattern, correction instruction data, and the like to the communication device 1 or 2 as the connection destination through the driver 11. The storage unit 15 stores data such as data of an eye mask pattern, data of a received waveform, and data obtained by superposing the eye mask pattern on the received waveform. The output unit 16 outputs the data stored in the storage unit 15 to a display device or the like. Consequently, an eye pattern or the like that is based on the output of the equalizer 22 can be visually observed. The CPUs 17 and 18 control the overall operations of the communication devices 1 and 2, respectively. Processing programs for the amplitude/emphasis adjustment unit 12, the transmission unit 14, the output unit 16, the equalizer adjustment unit 25, the comparison processing unit 28, and the like are stored in a program memory (not illustrated), and are executed in accordance with an instruction from the CPU 17 or 18.

Figure 2:
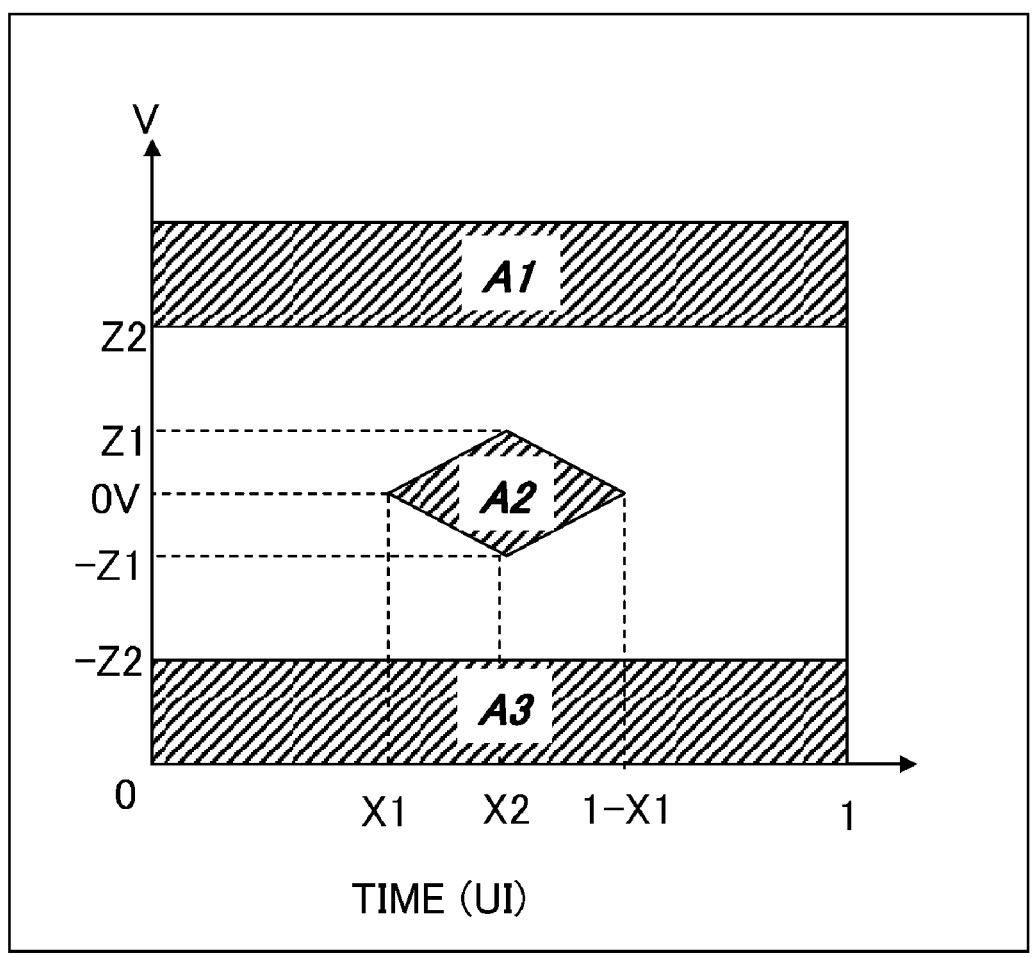
FIG. 2 is a first diagram illustrating an eye mask pattern.

FIG. 2 is a first diagram illustrating an eye mask pattern. An eye mask pattern may be a pattern used for determining the quality of a signal received from the counterpart device. FIG. 2 illustrates a reference eye mask pattern. The X axis represents time axis which is represented by the unit interval "UI". The Y axis represents voltage. The UI is the time interval of 1 bit, and 1 UI represents one time interval. A second area A2 corresponding to the eye portion has amplitude voltages Z1 and −Z1 which are centered on a voltage of 0 V. The voltage has maximum amplitude values Z2 and −Z2. An area with a voltage higher than the value Z2 is a first area A1, and an area with a voltage lower than the value −Z2 is a third area A3. The amplitude voltages of the reference eye mask pattern are compressed to ½ those of a differential waveform because they are compared with a received waveform that is input by single end. In the differential waveform, therefore, the values Z1, −Z1, Z2, and −Z2 are displayed as double voltage values. In the time axis, a value at the center between values X1 and 1−X1 at cross points, which are at both ends of the second area A2 corresponding to the eye portion, is represented by X2. The eye mask pattern data is stored in advance in the storage unit 15.

Referring back to FIG. 1, the receiving unit 21 receives data from the transmission line 3. The equalizer 22 improves the phase and amplitude characteristics of the received data. The decoder 23 converts the received data into a certain data format (for example, parallel data format) compatible with the interface with an information processing apparatus (not illustrated) connected to the communication device 1 or 2 that includes the decoder 23. The reception setting storage unit 24 stores an equalizer value (hereinafter referred to as an "EQ value") to be set in the equalizer 22 and any other suitable value. The equalizer adjustment unit 25 adjusts the characteristics of the equalizer 22 by referring to adjustment instruction data obtained from the reception setting storage unit 24.

The waveform comparing unit 26 includes the comparison unit 27 and the comparison processing unit 28. The waveform comparing unit 26 superposes a test pattern received from the communication device 2 or 1, which is the counterpart of the communication device 1 or 2 respectively including the waveform comparing unit 26, on the positive and negative waveforms in units of 1 bit (1 UI) to generate an eye pattern. Then, the waveform comparing unit 26 superposes the generated eye pattern on the reference eye mask pattern to determine whether or not there is an overlapping portion. When there is an overlapping portion, the waveform comparing unit 26 generates correction instruction data or the like to instruct the counterpart communication device 2 or 1 that has sent the test pattern respectively to correct the driver 11. The waveform comparing unit 26 also generates adjustment instruction data or the like for adjusting the equalizer 22 of the communication device 1 or 2 respectively including the waveform comparing unit 26.

Figure 3:
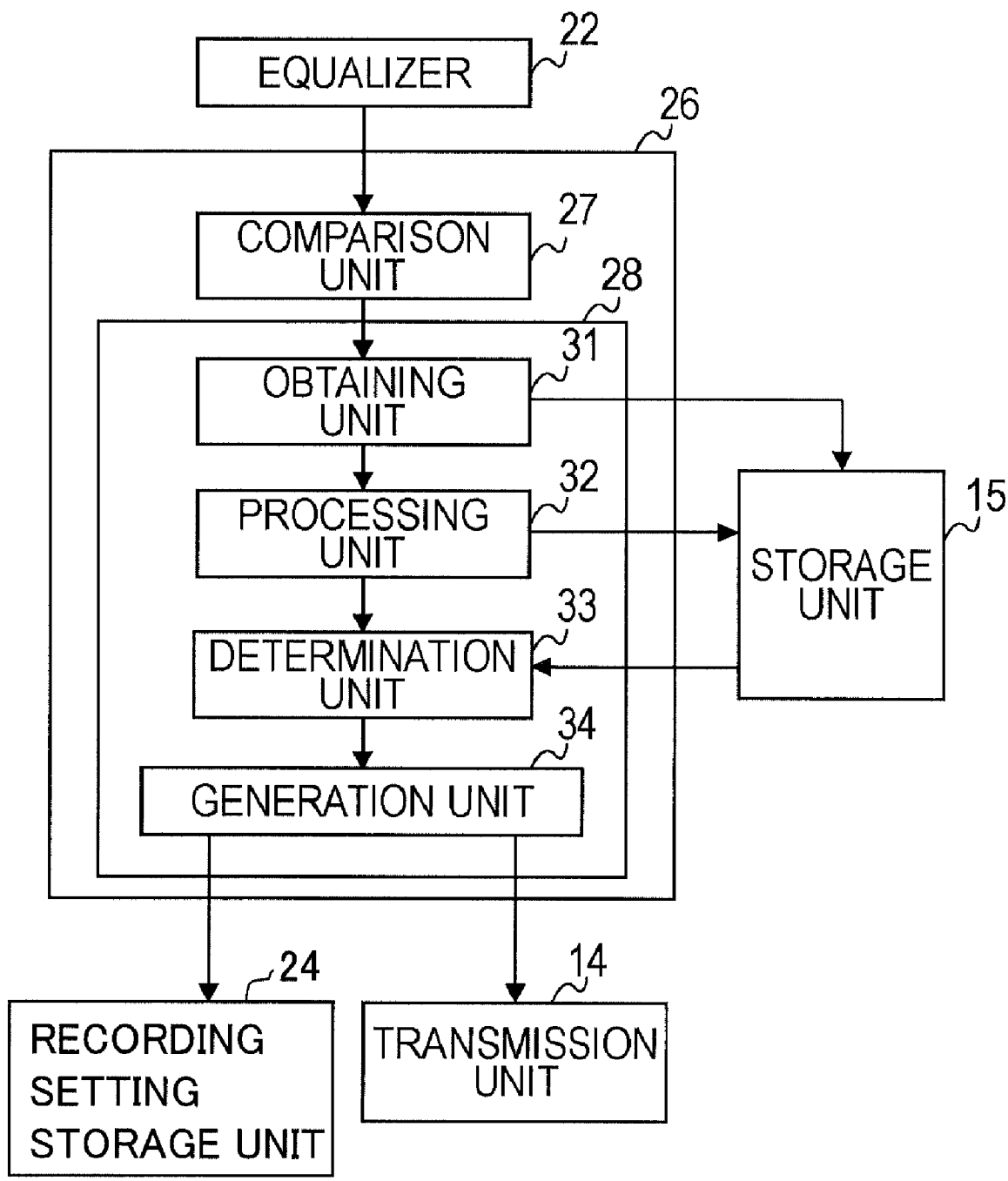
FIG. 3 is a diagram illustrating a waveform comparing unit.

FIG. 3 is a diagram illustrating the waveform comparing unit 26. The comparison unit 27 compares the received waveform with a predetermined threshold voltage to obtain received waveform data of the test pattern. The comparison processing unit 28 stores the received waveform data of the test pattern received from the counterpart communication device 2 or 1 respectively into the storage unit 15. Then, the comparison processing unit 28 compares the eye mask pattern data with the received waveform data of the received test pattern. When there is an overlapping portion, correction instruction data or the like is generated to instruct the counterpart communication device 2 or 1 that has respectively sent the test pattern to correct the driver 11. The comparison processing unit 28 includes an obtaining unit 31, a processing unit 32, a determination unit 33, and a generation unit 34. The obtaining unit 31 stores the received waveform data obtained by the comparison unit 27 into the storage unit 15. The processing unit 32 superposes the received waveform data stored in the storage unit 15 on the eye mask pattern data. The determination unit 33 determines whether or not there is an overlapping portion between the superposed received waveform data and the eye mask pattern data.

When the determination unit 33 determines, in terms of the amplitude value or the emphasis value, whether or not there is an overlapping portion between the superposed received waveform data and the eye mask pattern data, the generation unit 34 generates information about the determination result as instruction data, and sends the instruction data to the transmission unit 14. Specifically, when the determination unit 33 determines that there is an overlapping portion between the received waveform data and the eye mask pattern data, the generation unit 34 generates correction instruction data for correcting the amplitude value or the EN value.

When the determination unit 33 determines that there is no overlapping portion between the received waveform data and the eye mask pattern data, the generation unit 34 generates storage instruction data for storing the amplitude value or the EN value. When the determination unit 33 determines that there is an overlapping portion between the received waveform data and the eye mask pattern data after it determines that there is no overlapping portion between the received waveform data and the eye mask pattern data, the generation unit 34 generates optimum value setting instruction data. When the determination unit 33 determines, in terms of the EQ value, whether or not there is an overlapping portion between the superposed received waveform data and the eye mask pattern data, the generation unit 34 generates adjustment instruction data or the like for correcting the equalizer 22, and sends the adjustment instruction data to the equalizer adjustment unit 25.

Figure 4:
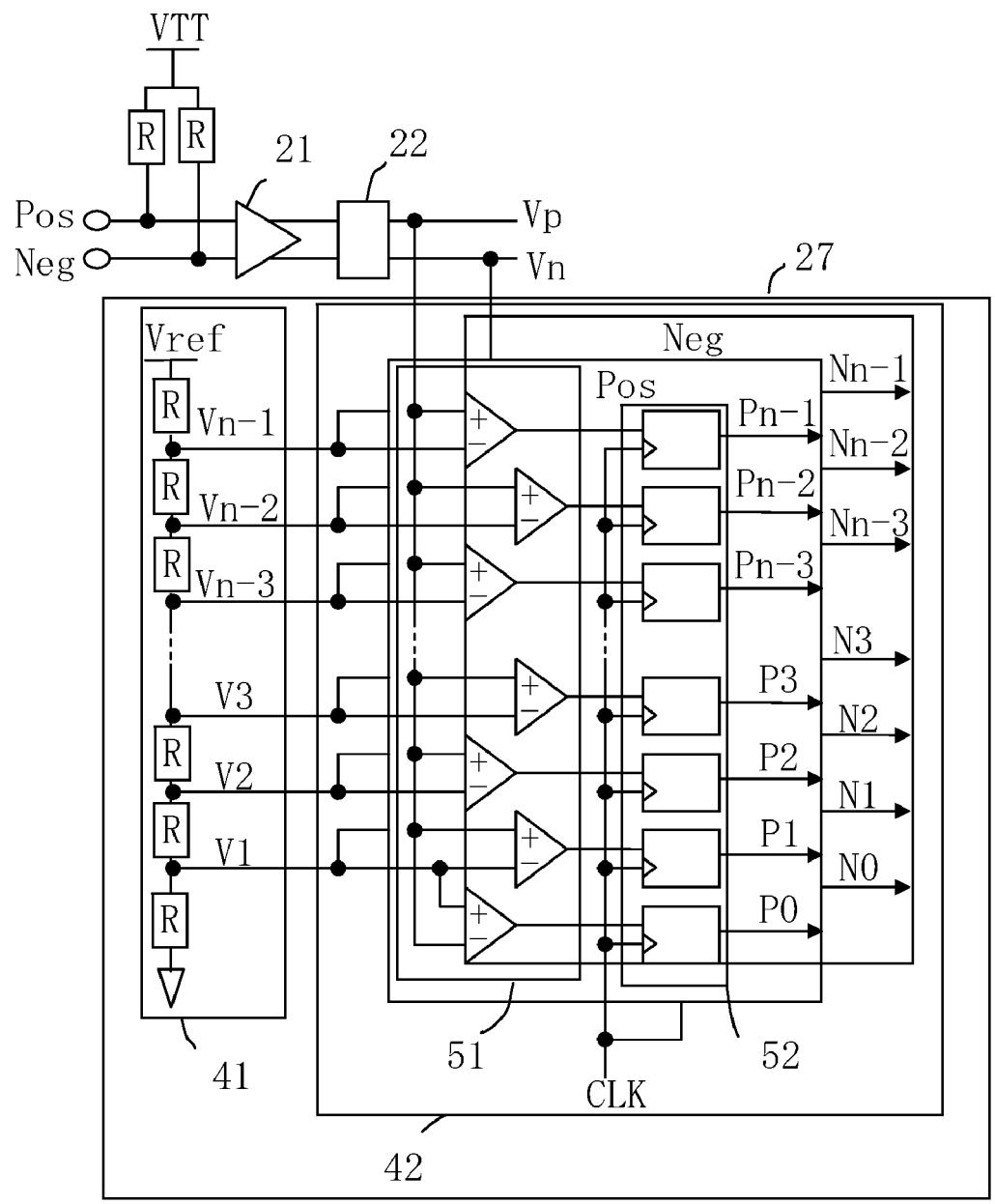
FIG. 4 is a diagram illustrating a first circuit configuration of a comparison unit.

FIG. 4 illustrates a first circuit configuration of the comparison unit 27. The comparison unit 27 includes a threshold voltage unit 41 and a comparison circuit unit 42. The comparison circuit unit 42 includes comparators 51 and latch memories 52. A test pattern transmitted from the communication device 1 or 2 is received by the receiving unit 21 of the communication device 2 or 1 and is input to the equalizer 22. A positive output Vp and a negative output Vn of the equalizer 22 are input to first input terminals of the comparators 51 in the comparison unit 27. Second input terminals of the comparators 51 receive threshold voltages V1 to Vn−1, which are obtained by equally dividing a voltage Vref into n sections by using resistors R.

The outputs of the comparators 51 are stored in the latch memories 52 in responses to a clock signal CLK as a trigger. Then, positive waveform outputs P0 to Pn−1 and negative waveform outputs N0 to Nn−1 are output to the comparison processing unit 28. The clock signal CLK is generated using a clock generation circuit (not illustrated) as a clock signal synchronized with the received test pattern. The data items stored in the latch memories 52 are stored into the storage unit 15 by using the obtaining unit 31 in chronological order of receipt.

Figure 5:
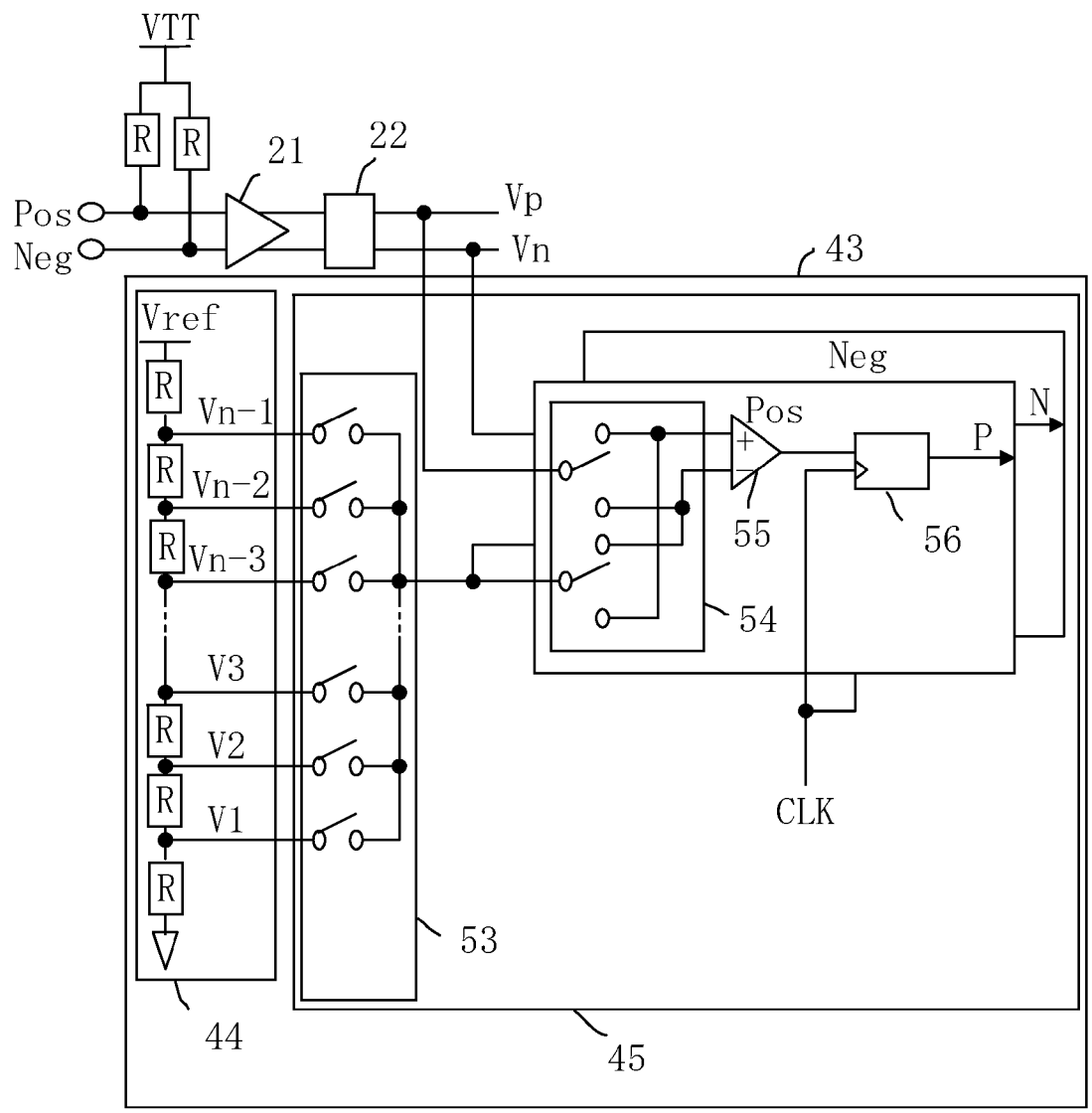
FIG. 5 is diagram illustrating a second circuit configuration of the comparison unit.

FIG. 5 illustrates a second circuit configuration of a comparison unit 43 according to another embodiment, which is different from the first circuit configuration of the comparison unit 27 described with reference to FIG. 4. Parallel data is output from the first circuit configuration illustrated in FIG. 4 whereas serial data is output from the second circuit configuration illustrated in FIG. 5. The second circuit configuration of the comparison unit 43 is a circuit configuration with a smaller number of circuits than the number of circuits including the comparators 51 and the latch memories 52 in the first circuit configuration. The comparison unit 43 includes a threshold voltage unit 44 and a comparison circuit unit 45. The comparison circuit unit 45 includes a first switch unit 53, a second switch unit 54, a comparator 55, and a latch memory 56. The first switch unit 53 and the second switch unit 54 are sequentially switched to change an output of the latch memory 56 from the parallel output to the serial output. A positive output Vp and a negative output Vn of the equalizer 22 are input to a first input terminal of the comparator 55 in the comparison circuit unit 45, respectively. A second input terminal of the comparator 55 receives threshold voltages V1 to Vn−1, which are obtained by equally dividing a voltage Vref into n sections by using resistors R.

The first switch unit 53 time-divisionally switches the input threshold voltages V1 to Vn−1, which are obtained by equally dividing the voltage Vref into n sections by using the resistors R, and inputs the threshold voltages V1 to Vn−1 to the comparator 55. When comparisons for up to the threshold voltage V1 have been completed, the second switch unit 54 is switched so that the threshold voltage V1 is input to the comparator 55. In this case, the input terminal for the threshold voltage V1 and the input terminal for the positive output Vp and the negative output Vn of the equalizer 22 are reversed by switching the second switch unit 54. Therefore, it is possible to determine whether or not the positive output Vp and the negative output Vn are voltages lower than the threshold voltage V1.

FIGS. 6A and 6B illustrate received waveform data. The received waveform data illustrated in FIGS. 6A and 6B is generated by obtaining a received waveform using the comparison unit 27 in chronological order. The X axis represents time of 1 UI. "CLK" denotes the time when the peak of the received waveform occurs. "Δϕ" denotes a time shift. The Y axis represents threshold voltages V1 to V14. Value "1" indicates that an output of the received waveform is greater than the threshold voltage. Value "0" indicates that an output of the received waveform is equal to or less than the threshold voltage. FIG. 6A illustrates the positive waveform data. The data is stored in the storage unit 15 using the obtaining unit 31. FIG. 6B illustrates the negative waveform data. The data is stored in the storage unit 15 using the obtaining unit 31.

Figure 7:
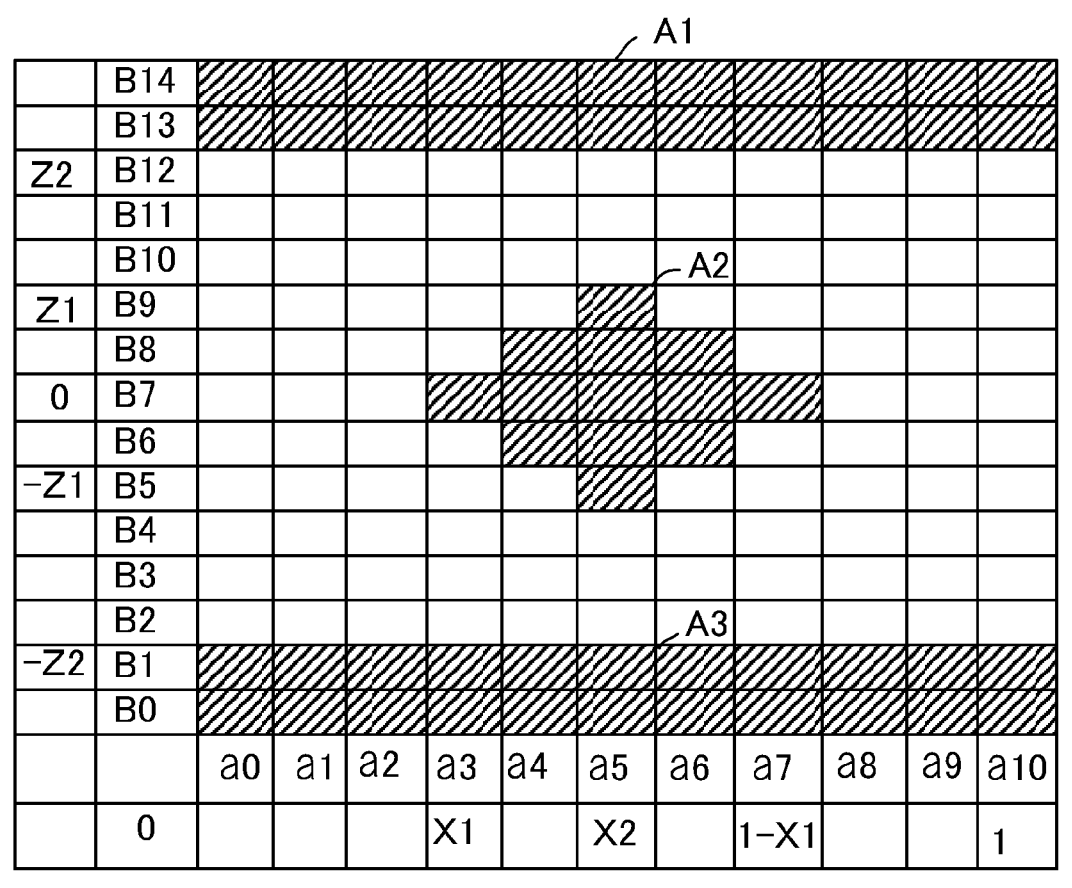

FIG. 7 is a second diagram illustrating an eye mask pattern. A reference eye mask pattern is stored in an address space ranging from (a0, B0) to (a10, B14) on the storage unit 15, by way of example. An eye mask pattern is represented by hatched portions, and a receivable area is represented by blank portions. The hatched portions have data "1" and the blank portions have data "0". The eye mask pattern includes a first area A1, a second area A2, and a third area A3.

Figure 8A:
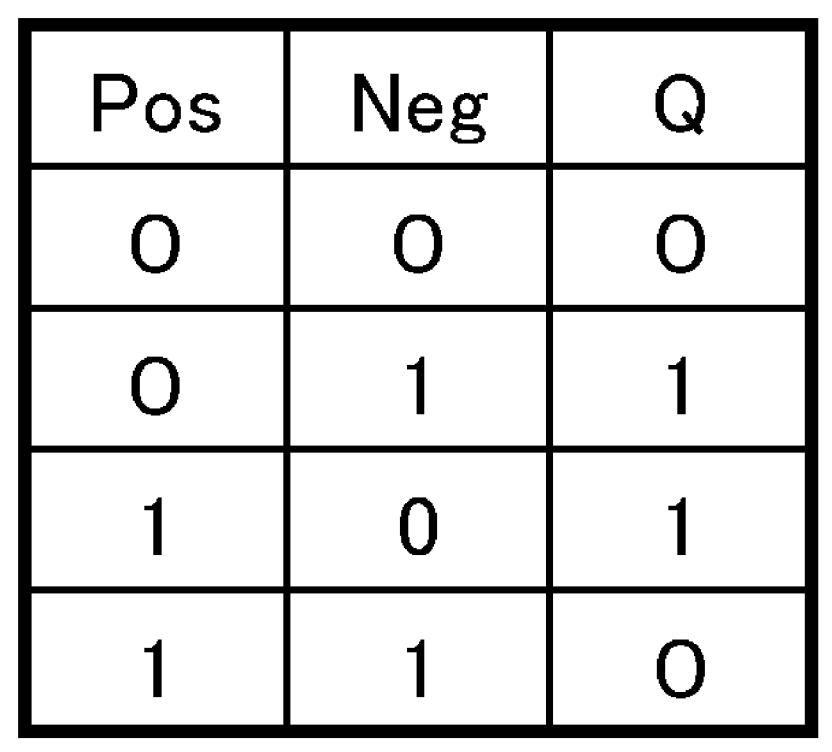

FIGS. 8A and 8B are first diagrams illustrating superposition of the received waveform. First, the processing unit 32 of the waveform comparing unit 26 calculates an exclusive OR logical operation results between the positive waveform data and the negative waveform data, which are stored in the storage unit 15.

FIG. 8A illustrates a calculation table for performing the exclusive OR operation. "Pos" denotes the positive waveform data, which is supplied to one input of the exclusive OR logical operation, and "Neg" denotes the negative waveform data, which is supplied to the other input of the exclusive OR operation. "Q" denotes a result of the exclusive OR logical operation.

FIG. 8B illustrates results of the exclusive OR logical operation between the positive waveform data illustrated in FIG. 6A and the negative waveform data illustrated in FIG. 6B. In this case, an area defined by the positive waveform and negative waveform of the received waveform has values that are all "1 s" and is filled with solid color when it is displayed on the screen. Therefore, no visual observation is possible even when the eye mask pattern is superposed and displayed. In the present embodiment, a portion with data "1" is filled with solid color when it is displayed. Accordingly, the following calculation process is performed to extract the shape of the waveform from the received waveform data illustrated in FIGS. 8A and 8B.

FIGS. 9A, 9B, and 9C are second diagrams illustrating superposition of the received waveform. FIGS. 9A and 9B illustrate calculation tables indicating the content of the operation for extracting data "1" along the shape of the received waveform. A given grid in FIG. 8B is represented by Qb, and grids represented by Qb+1 and Qb−1, which sandwich the grid Qb therebetween in the vertical direction (the B0 to B14 direction), are extracted to perform an operation. The operation is performed on all the grids. The calculation table illustrated in FIG. 9A will now be described. First, an NAND logical operation (negative AND logical operation) is performed between Qb+1, Qb, and Qb−1 to determine S. S denotes an intermediate value of the operation. Then, calculation is performed in accordance with the calculation table illustrated in FIG. 9B. Specifically, an AND logical operation is performed between S and Qb to determine T. T denotes the finally obtained value of the operation. Data "1" of T represents a portion of the shape of the waveform. FIG. 9C illustrates an operation result represented by T.

FIG. 10 is a diagram illustrating superposition of the eye mask pattern and the received waveform. FIG. 10 illustrates superposition of the eye mask pattern and the received waveform, which are located on the storage unit 15. Portions with data "1" are displayed on the screen and can be visually observed. In the example of FIG. 10, there is no overlapping portion between the eye mask pattern and received waveform when they are superposed, and it is thus determined that the transmission quality is high.

Figure 11:
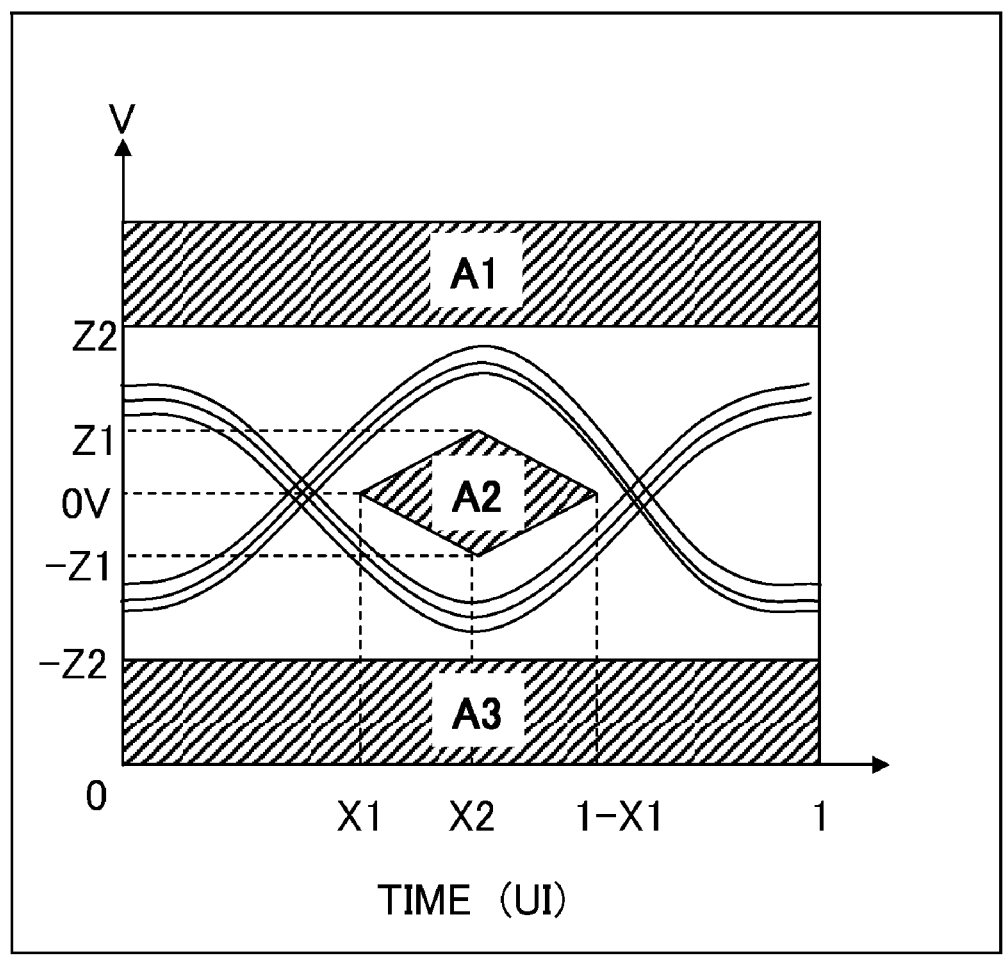
FIG. 11 is a diagram illustrating a first example of superposition of the eye mask pattern and the received waveform.

FIG. 11 illustrates a first example of superposition of the eye mask pattern and the received waveform. In the example illustrated in FIG. 11, the data stored in the storage unit 15 is displayed on the screen using the output unit 16, by way of example. In the example illustrated in FIG. 11, there is no overlapping portion between the received waveform and the eye mask pattern, and the transmission quality is high.

<Overview of Operation>

A system for automatically adjusting the settings for data transmission from the communication device 1 to the communication device 2 will now be described. The operation of a system for automatically adjusting the settings for data transmission from the communication device 2 to the communication device 1 is similar, and will not be discussed herein. The output characteristic values of the driver 11 of the communication device 1 are initialized so that the set value of amplitude is a maximum value and the set value of emphasis, namely, the EN value, is a minimum value. The set value of the equalizer 22 of the communication device 2, namely, the EQ value, is set to a minimum value. In the following description, the values are adjusted in order of the amplitude value, the EN value, and the EQ value.

(1) Adjustment of Amplitude Value

The amplitude value of the driver 11 of the communication device 1 is adjusted by comparing an amplitude value of the received waveform with an amplitude value of the eye mask pattern using the waveform comparing unit 26 of the communication device 2.

Figure 12:
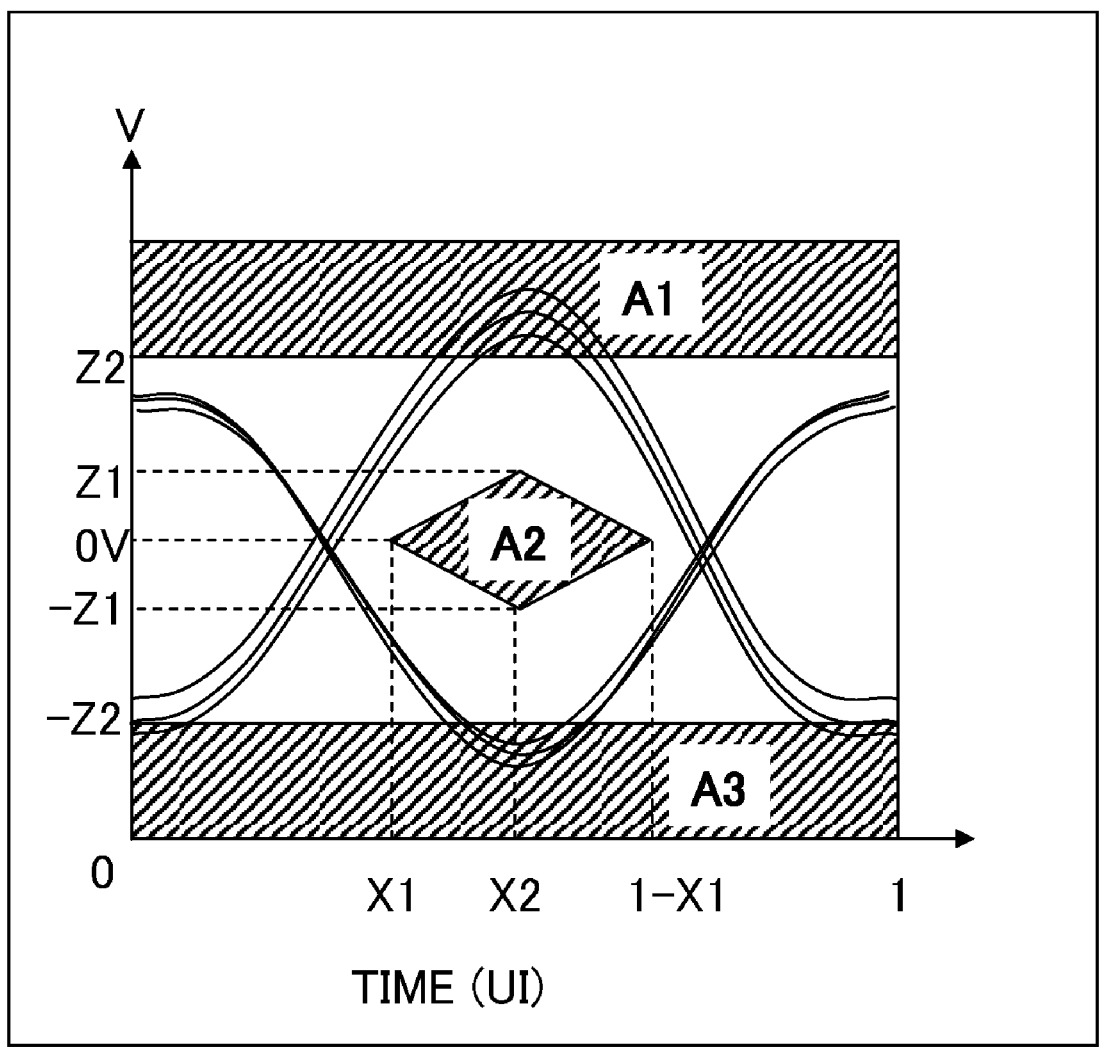
FIG. 12 is a diagram illustrating a second example of superposition of the eye mask pattern and the received waveform.

FIG. 12 illustrates a second example of superposition of the eye mask pattern and the received waveform. In the example illustrated in FIG. 12, the received waveform appears in both the first area A1 and the third area A3 of the eye mask pattern. In this case, in accordance with the resulting superposition between the received waveform and the eye mask pattern, the set value of amplitude of the driver 11 is decreased in steps of one until the received waveform does not appear in the first area A1 or the third area A3. To achieve this operation, the communication device 2 transmits correction instruction data to the communication device 1. The communication device 1 sequentially decreases the set value of amplitude in steps of one each time the communication device 1 receives correction instruction data. When the received waveform does not appear in the first area A1 or the third area A3, the communication device 2 sends storage instruction data to the communication device 1. Upon receipt of the storage instruction data, the communication device 1 stores the current set value of amplitude in the transmission setting storage unit 13 as a first set amplitude value. Then, upon receipt of correction instruction data, the communication device 1 further decreases the set value of amplitude of the driver 11 in steps of one until the received waveform appears in the second area A2.

Figure 13:
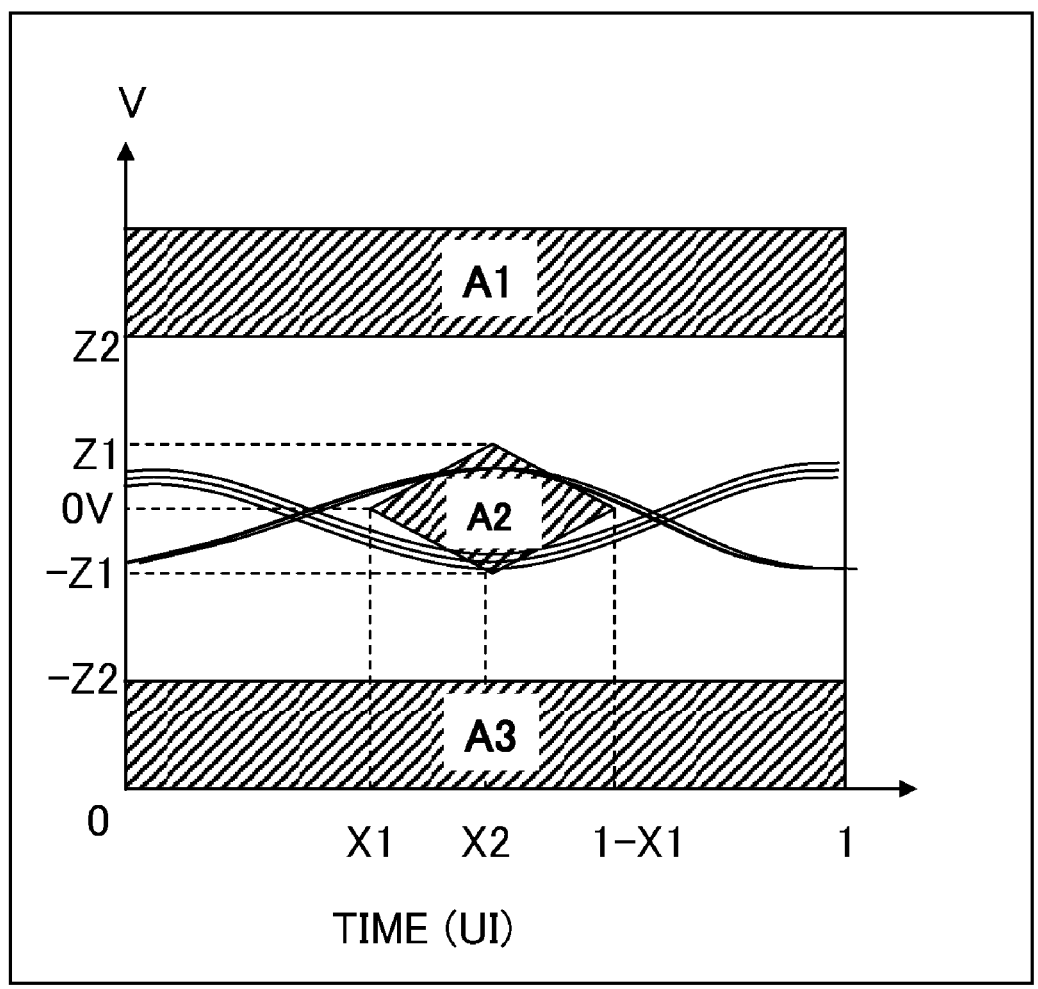
FIG. 13 is a diagram illustrating a third example of superposition of the eye mask pattern and the received waveform.

FIG. 13 illustrates a third example of superposition of the eye mask pattern and the received waveform. In the example illustrated in FIG. 13, the received waveform appears in the second area A2. The communication device 2 transmits optimum value setting instruction data to the communication device 1. Upon receipt of the optimum value setting instruction data, the communication device 1 stores the current set value of amplitude in the transmission setting storage unit 13 as a second set amplitude value. Next, an intermediate value between the first and second set amplitude values is set as an optimum value in the set value of amplitude of the driver 11, and is also stored in the transmission setting storage unit 13.

(2) Adjustment of EN Value

When the adjustment of the optimum value of amplitude has been completed, then, the EN value is adjusted to adjust the phase. The EN value is initialized to a minimum value. The EN value is adjusted by comparing the received waveform with the eye mask pattern using the waveform comparing unit 26 of the communication device 2.

Figure 14:
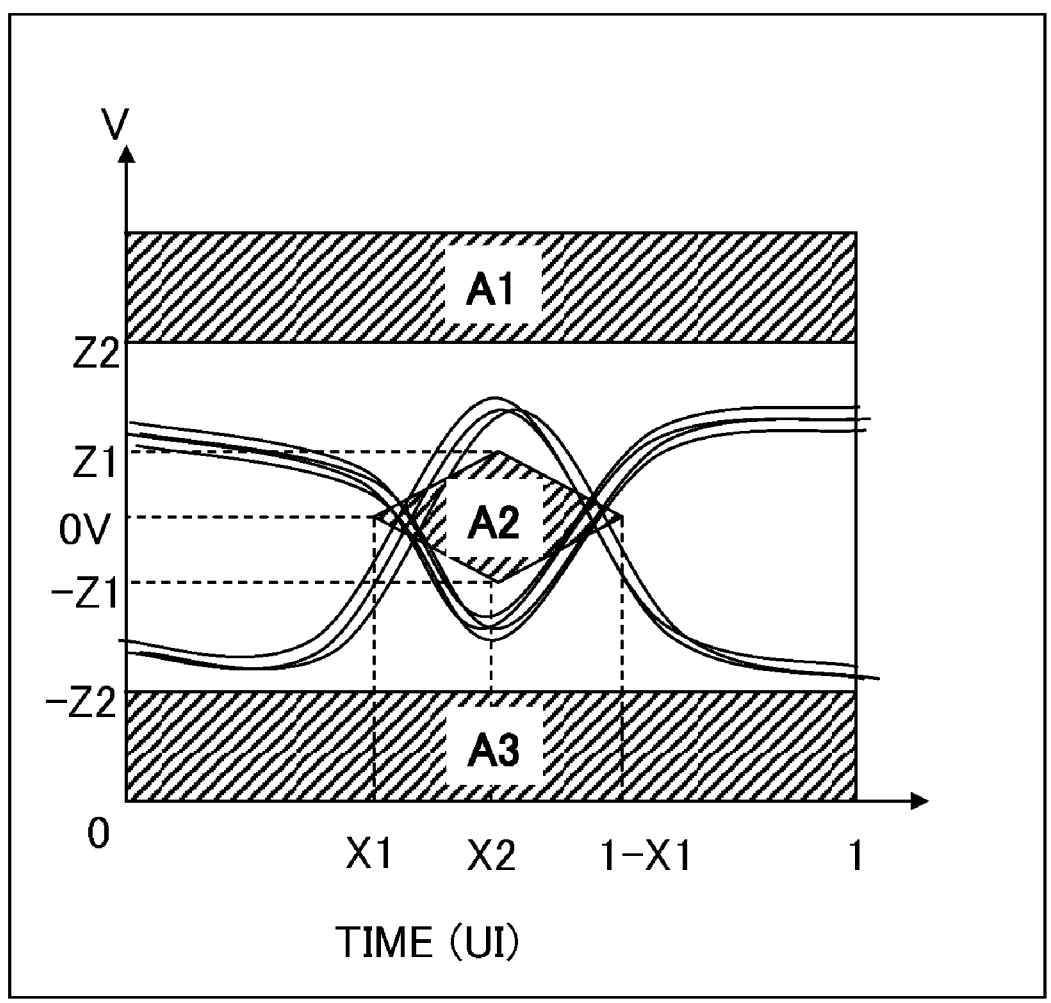
FIG. 14 is a diagram illustrating a fourth example of superposition of an eye mask pattern and a received waveform.

FIG. 14 illustrates a fourth example of superposition of the eye mask pattern and the received waveform. In the example illustrated in FIG. 14, the received waveform appears in the second area A2. When the received waveform of the test pattern appears in one of the first area A1, the second area A2, and the third area A3 of the eye mask pattern, the communication device 2 transmits correction instruction data to the communication device 1. Upon receipt of the correction instruction data, the communication device 1 increases the EN value of the driver 11 until the received waveform does not appear in the first area A1, the second area A2, or the third area A3. When the received waveform overlaps none of the first area A1, the second area A2, and the third area A3, the communication device 2 transmits storage instruction data. Upon receipt of the storage instruction data, the communication device 1 stores the current EN value in the transmission setting storage unit 13 as a first EN value.

Then, upon receipt of correction instruction data from the communication device 2, the communication device 1 further increases the EN value. When the received waveform appears in one of the first area A1, the second area A2, and the third area A3, the communication device 2 transmits optimum value setting instruction data to the communication device 1. Upon receipt of the optimum value setting instruction data, the communication device 1 stores the current EN value in the transmission setting storage unit 13 as a second EN value. Next, an intermediate value between the first EN value and the second EN value is set as an optimum EN value in the driver 11, and is also stored in the transmission setting storage unit 13.

(3) Adjustment of EQ Value

When the setting of an optimum value of amplitude and an optimum EN values has been completed, the equalizer 22 is adjusted. The EQ value is initialized to a minimum value. The equalizer 22 is adjusted by comparing the phase of the received waveform with the phase of the eye mask pattern using the waveform comparing unit 26 of the communication device 2. First, a test pattern is transmitted from the communication device 1 to the communication device 2.

When the received waveform appears in one of the first area A1, the second area A2, and the third area A3, the EQ value is increased until the received waveform does not appear in the first area A1, the second area A2, or the third area A3, so that the received waveform appears in none of the above areas. Next, when the received waveform appears in none of the first area A1, the second area A2, and the third area A3, the current EQ value is stored in the reception setting storage unit 24 as a first EQ value. Next, the EQ value is increased in steps of one until the received waveform appears in one of the first area A1, the first area A2, and the third area A3. Then, when the received waveform appears in one of the first area A1, the second area A2, and the third area A3, the current EQ value is stored in the reception setting storage unit 24 as a second EQ value.

Then, an intermediate value between the first EQ value and the second EQ value is set as an optimum EQ value in the equalizer 22 of the communication device 2, and is also stored in the reception setting storage unit 24. Finally, the received waveform illustrated in FIG. 11 satisfies the requirements of reception quality.

<Detailed Description of Operation>

The operation will now be described in detail. A system for automatically adjusting the settings for data transmission from the communication device 1 to the communication device 2 will now be described. The operation of a system for automatically adjusting the settings for data transmission from the communication device 2 to the communication device 1 is similar, and will not be discussed herein.

When data such as a comparison result is transmitted from the communication device 2 to the communication device 1, the transmission speed is lower than the transmission speed of transmission from the communication device 1 to the communication device 2. For example, the transmission speed of transmitting data such as a comparison result is reduced to ½ or ¼ the transmission speed of transmission from the communication device 1 to the communication device 2. This ensures that the communication device 1 can be notified of feedback information. Examples of data such as a comparison result include correction instruction data, storage instruction data, optimum value setting instruction data, change instruction data, transmission request data, and test completion notification data.

Figure 15:
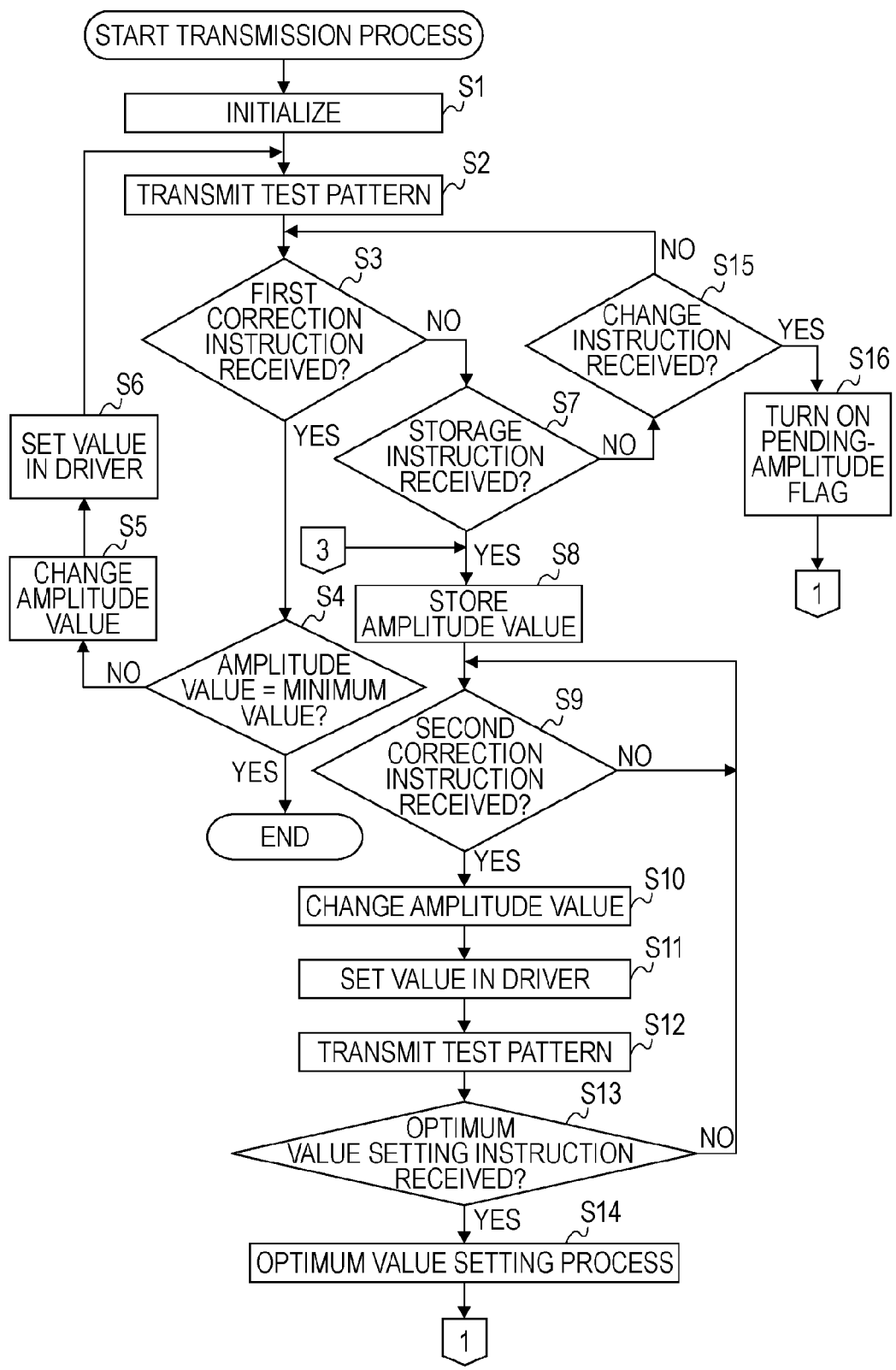
FIG. 15 is a flowchart illustrating a first portion of a flow of a transmission process.

FIG. 15 illustrates a first portion of a flow of a transmission process. FIG. 15 is a flowchart illustrating a process for automatically setting the amplitude value of the driver 11 of the communication device 1.

First, the individual units of the communication device 1 are initialized (step S1). In the initialization operation, the transmission amplitude value of the driver 11 of the communication device 1 is set to a maximum value A. Further, the EN value is set to a minimum value E. Further, the EQ value is set to a minimum value F. Next, a test pattern is transmitted from the communication device 1 to the communication device 2 (step S2). Next, response data to the test pattern transmitted to the communication device 2, which has been received from the communication device 2, is checked.

First, it is determined whether or not first correction instruction data has been received as response data (step S3). When first correction instruction data has been received from the communication device 2, it is determined whether or not the amplitude value set in the driver 11 is a minimum value (step S4). When the set amplitude value is a minimum value, the amplitude value cannot be further reduced and the process ends. When the set amplitude value is not a minimum value, the set amplitude value is reduced by one step (step S5). Next, the current amplitude value, which has been reduced by one step, is set in the driver 11, and the process returns to step S2 (step S6). When it is determined in step S3 that the response data to the test pattern, which has been received from the communication device 2, is not first correction instruction data, it is determined whether or not storage instruction data has been received (step S7).

When the response data received from the communication device 2 is storage instruction data, the current set amplitude value of the driver 11, for example, the value represented by A−m, is stored in the transmission setting storage unit 13 (step S8). In this case, if a pending-amplitude flag is set to "1", the pending-amplitude flag is changed to "0". The pending-amplitude flag is turned on when the received waveform of the test pattern appears in the second area A2 in the initial state.

Next, it is determined whether or not second correction instruction data has been received from the communication device 2 (step S9). When second correction instruction data has been received from the communication device 2, the set amplitude value is reduced by one step (step S10). Next, the amplitude value changed in step S10 is set in the driver 11 (step S11). Next, a test pattern is transmitted to the communication device 2 (step S12). Next, response data to the transmitted test pattern, which has been received from the communication device 2, is checked.

First, it is determined whether or not an optimum value setting instruction has been received as response data from the communication device 2 (step S13). When an optimum value setting instruction has been received from the communication device 2, an intermediate value setting process is performed. Specifically, the current set amplitude value of the driver 11, for example, the value represented by A−n, is stored in the transmission setting storage unit 13, and the value represented by ((A−m)+(A−n))/2 is determined. The resulting set value is stored as an optimum amplitude value in the transmission setting storage unit 13, and is also set in the driver 11 (step S14). Then, the processing of step S21 is executed. When no optimum value setting instruction has been received from the communication device 2, the processing of step S9 is executed. When it is determined in step S15 that the response data received from the communication device 2 is change instruction data, the pending-amplitude flag is turned on (step S16), and the processing of step S21 is executed.

The change instruction data may be data used by the communication device 2 to notify the communication device 1 when the received waveform of the sent test pattern appears in the second area A2 in the initial state.

Figure 16:
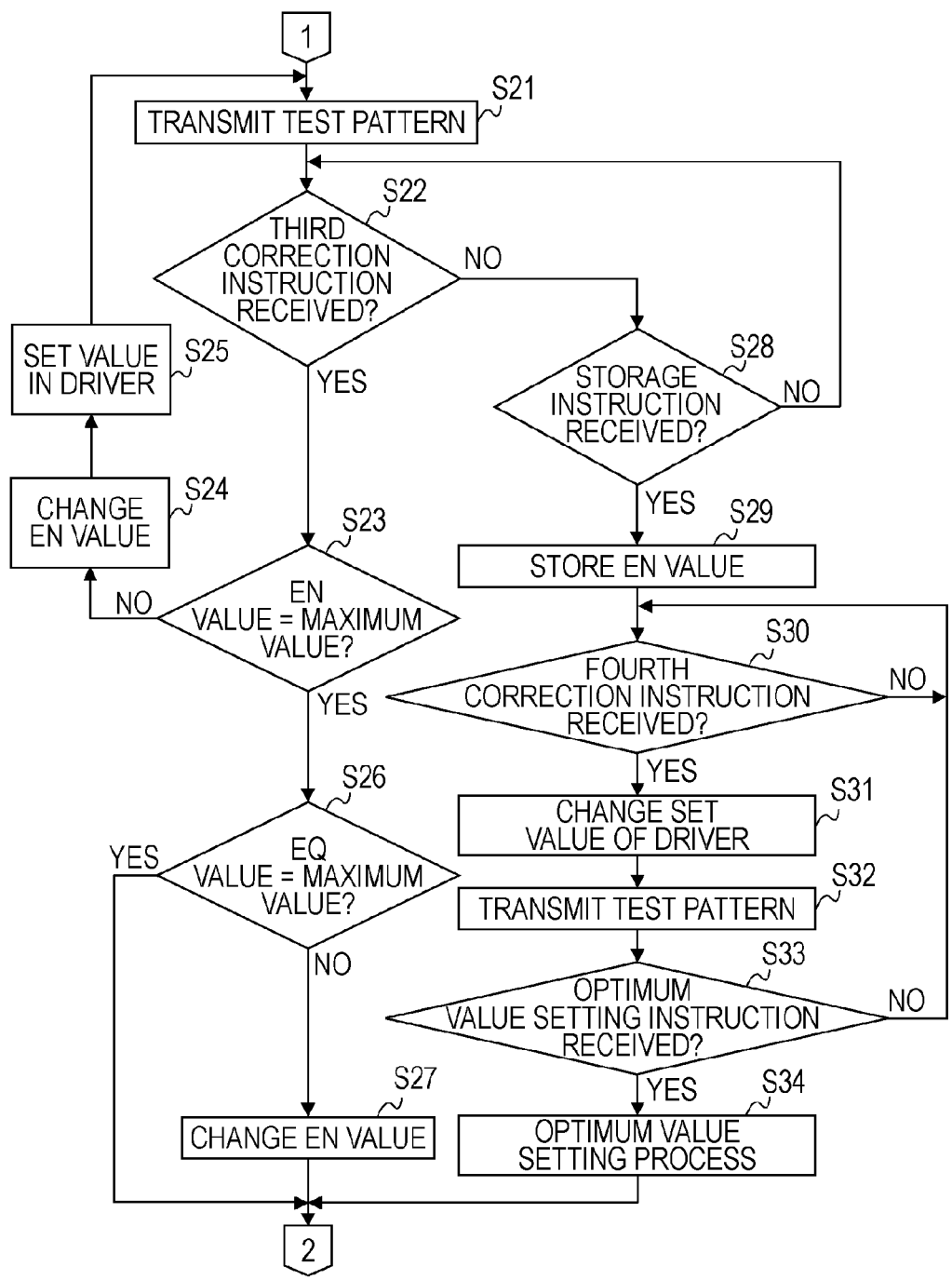
FIG. 16 is a flowchart illustrating a second portion of the flow of the transmission process.

FIG. 16 illustrates a second portion of the flow of the transmission process. FIG. 16 is a flowchart illustrating a process for automatically setting the EN value of the driver 11 of the communication device 1.

First, a test pattern is transmitted to the communication device 2 (step S21). Then, response data to the transmitted test pattern, which has been received from the communication device 2, is checked. First, it is determined whether or not the response data is third correction instruction data (step S22).

When the response data received from the communication device 2 is third correction instruction data, it is determined whether or not the EN value set in the communication device 1 is a maximum value (step S23). When the set EN value is not a maximum value, the EN value is increased by one step (step S24). Then, the current EN value, which has been increased by one step, is set in the driver 11 (step S25).

When it is determined in step S23 that the EN value is a maximum value, if the EQ value is increased by one step, the resulting EQ value exceeds the maximum value. Thus, it is determined whether or not the set EQ value is a maximum value (step S26).

When the set EQ value is not a maximum value, the EN value is changed to the minimum value E, and then the processing of step S41 is executed. When the current EN value setting process is the second or subsequent time, the EN value is increased by one step, starting from the minimum value E (step S27), and the processing of step S41 is executed.

When it is determined in step S26 that the EQ value is a maximum value, the processing of step S41 is executed with the EN value maintained as the maximum value.

When it is determined in step S22 that the response data to the test pattern, which has been received from the communication device 2, is not a third correction instruction, it is determined whether or not a storage instruction has been received from the communication device 2 (step S28).

When a storage instruction has been received from the communication device 2, the current EN value of the driver 11, for example, the value represented by E+m, is stored in the transmission setting storage unit 13 (step S29). Next, it is determined whether or not a fourth correction instruction has been received from the communication device 2 (step S30).

When it is determined that a fourth correction instruction has been received from the communication device 2, the EN value is increased by one step to change the set value of the driver 11 (step S31). Next, a test pattern is transmitted to the communication device 2 (step S32). Next, response data to the test pattern, which has been received from the communication device 2, is checked. First, it is determined whether or not an optimum value setting instruction has been received as response data from the communication device 2 (step S33).

When an optimum value setting instruction has been received, an intermediate value setting process is performed. Specifically, the current set EN value of the driver 11, for example, the value represented by E+n, is stored in the transmission setting storage unit 13, and the value represented by ((E+m)+(E+n))/2 is determined. The resulting set value is stored in the transmission setting storage unit 13, and is also set in the driver 11 (step S34). Then, the processing of step S41 is executed.

When no optimum value setting instruction has been received, the processing of step S30 is executed.

Figure 17:
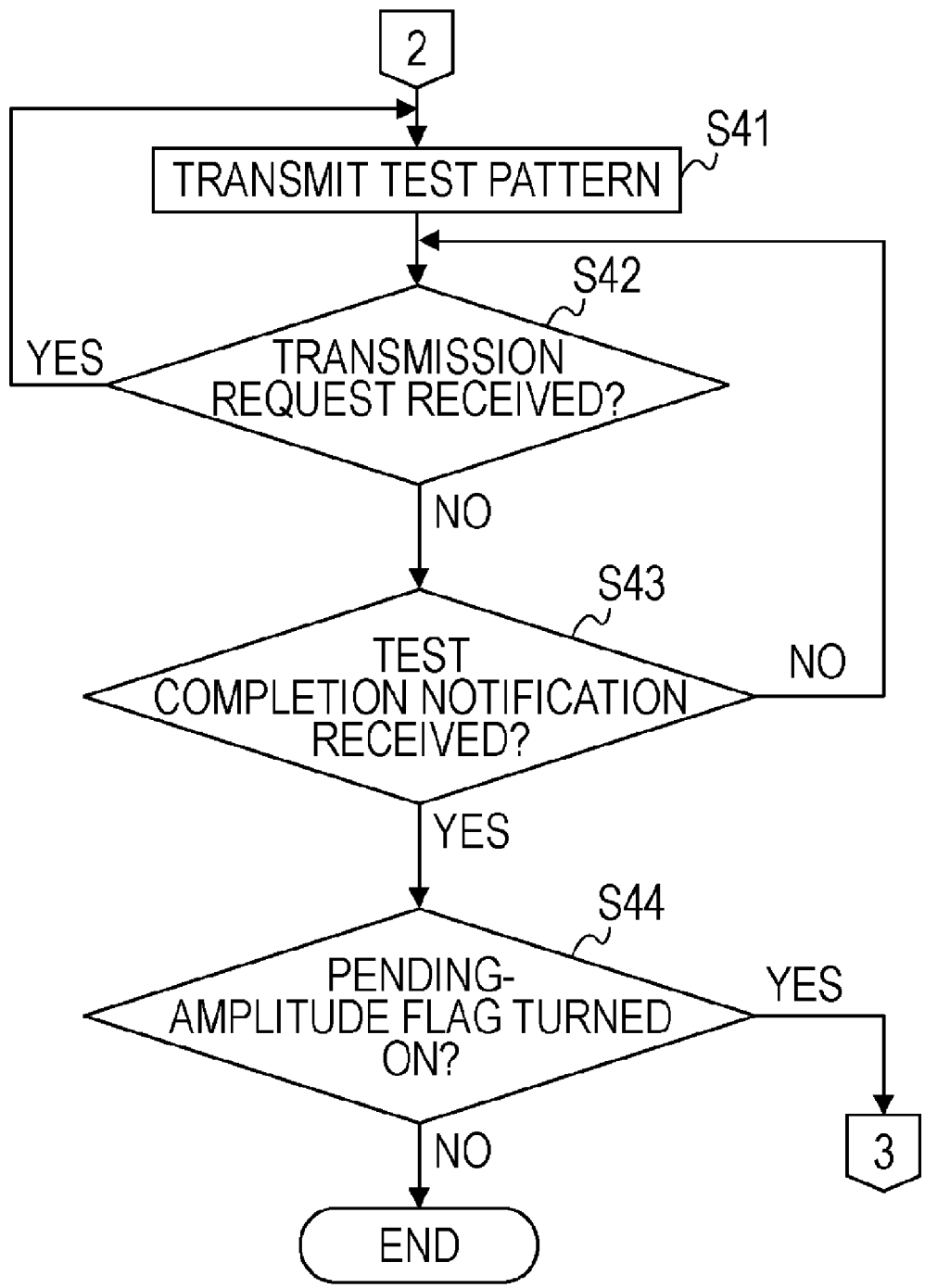
FIG. 17 is a flowchart illustrating a third portion of the flow of the transmission process.

FIG. 17 illustrates a third portion of the flow of the transmission process.

FIG. 17 is a flowchart illustrating a transmission process performed by the communication device 1 to adjust the equalizer 22 of the communication device 2.

The communication device 1 transmits a test pattern (step S41). The communication device 1 determines whether or not transmission request data has been received from the communication device 2 (step S42).

When transmission request data has been received from the communication device 2, the processing of step S41 is executed. When no transmission request has been received from the communication device 2, it is determined whether or not test completion notification data has been received (step S43). The receipt of a test completion notification from the communication device 2 indicates that the adjustment of the equalizer 22 of the communication device 2 has been completed. Next, the communication device 1 determines whether or not the pending-amplitude flag is turned on (step S44).

When the pending-amplitude flag is turned on, the process proceeds to step S8. When the pending-amplitude flag is turned off, the process ends.

Figure 18:
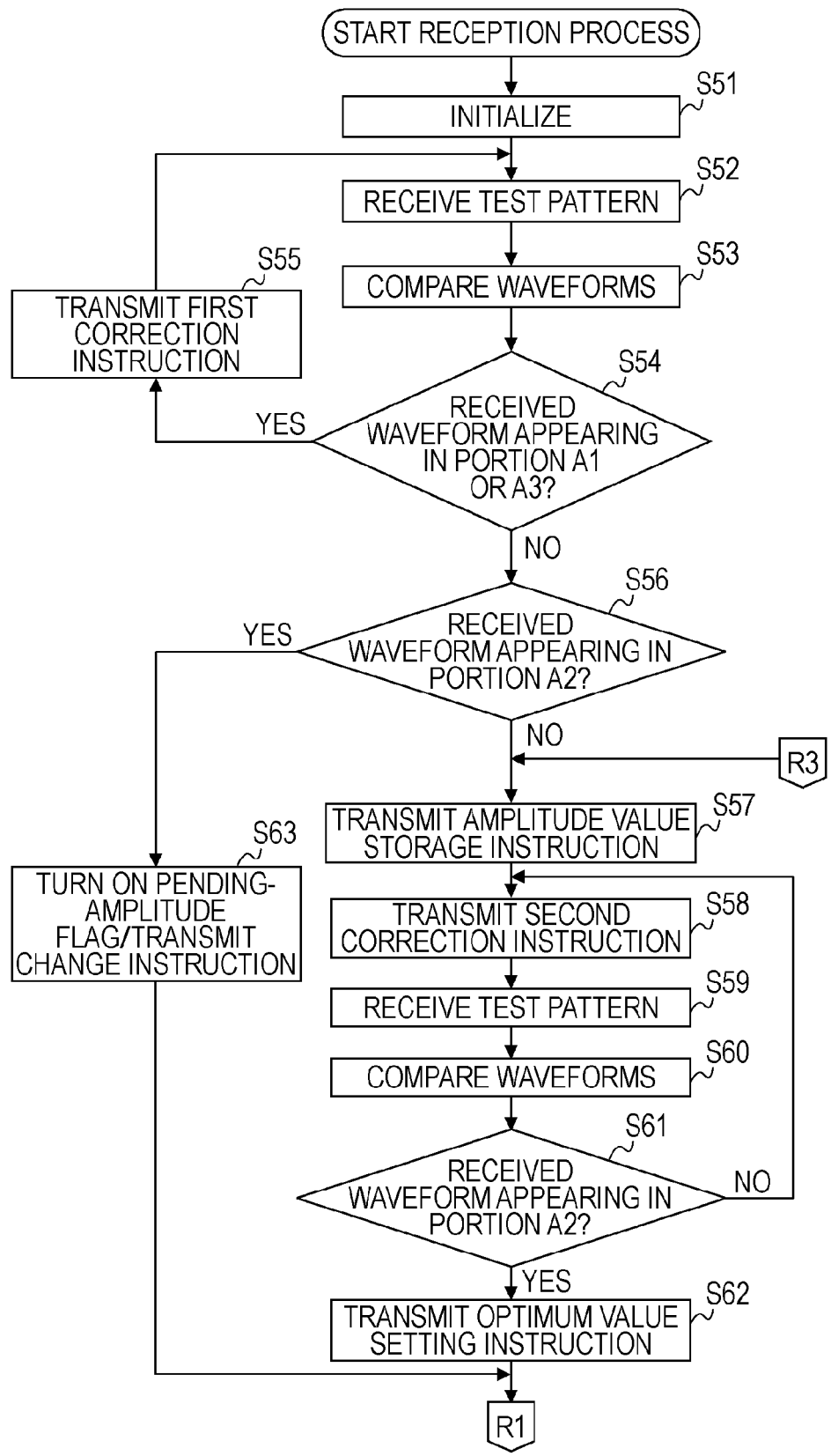
FIG. 18 is a flowchart illustrating a first portion of a flow of a reception process.

FIG. 18 illustrates a first portion of a flow of a reception process. The communication device 2 performs a process for correcting the amplitude of the driver 11 of the communication device 1.

First, the individual units of the communication device 2 are initialized (step S51). In the initialization operation, the EQ value of the receiving unit 21 is set to a minimum value F. Next, a test pattern is received from the communication device 1 (step S52). Next, the waveform comparing unit 26 compares the amplitude of the received waveform with the amplitude of the eye mask pattern on the basis of the test pattern received from the communication device 1 (step S53). Then, it is determined whether or not the received waveform appears in the first area A1 or third area A3 of the eye mask pattern (step S54).

When the received waveform appears in either area, first correction instruction data is transmitted to the communication device 1 so as to reduce the transmission amplitude by one step (step S55), and the processing of step S52 is executed.

When it is determined in step S54 that the received waveform does not appear in the first area A1 or the third area A3, it is determined whether or not the received waveform appears in the second area A2 of the eye mask pattern (step S56).

When the received waveform appears in the second area A2, it is difficult to optimize the transmission amplitude value of the communication device 1 if the current settings are used. Thus, it is preferable to temporarily stop the process for adjusting the amplitude value. Then, change instruction data is transmitted to the communication device 1 to turn on the pending-amplitude flag of the communication device 1, and a pending-amplitude flag of the communication device 2 is also turned on (step S63). Then, the processing of step S71 is executed.

When it is determined in step S56 that the received waveform does not appear in the second area A2, storage instruction data for storing the amplitude value is transmitted to the communication device 1 so as to temporarily store the current transmission amplitude value (step S57). Next, second correction instruction data is transmitted to the communication device 1 so as to reduce the transmission amplitude of the driver 11 by one step (step S58). Next, a test pattern is received from the communication device 1 (step S59). Then, the waveform comparing unit 26 compares the received waveform with the eye mask pattern on the basis of the test pattern received from the communication device 1 (step S60). Then, it is determined whether or not the received waveform appears in the second area A2 (step S61).

When the received waveform does not appear in the second area A2, the process of step S58 is executed. When the received waveform appears in the second area A2, optimum value setting instruction data is transmitted to the communication device 1 (step S62). Next, the processing of step S71 is executed.

Figure 19:
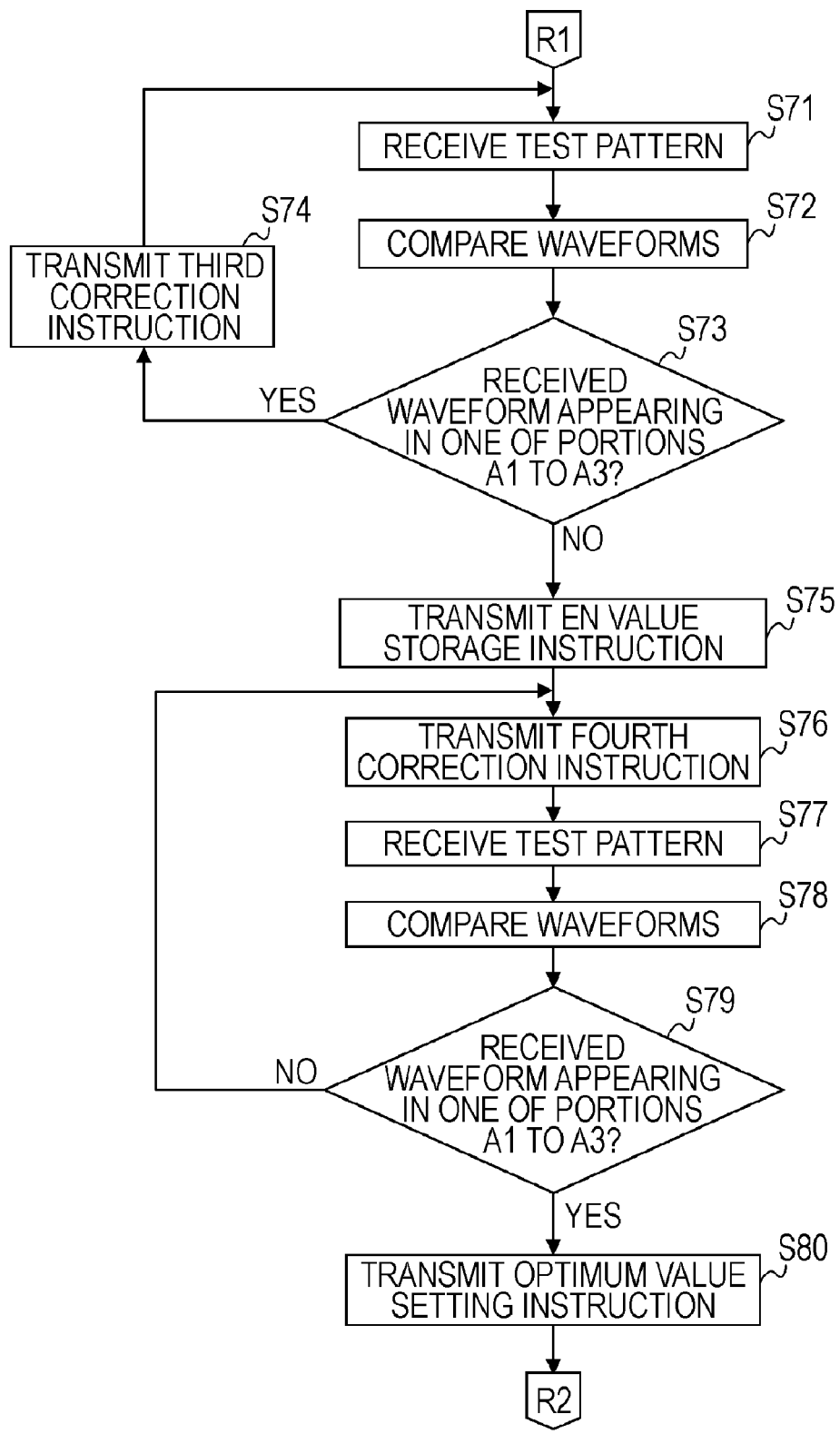
FIG. 19 is a flowchart illustrating a second portion of the flow of the reception process.

FIG. 19 illustrates a second portion of the flow of the reception process. The communication device 2 performs a phase adjustment process for the driver 11 of the communication device 1.

First, the communication device 2 receives a test pattern from the communication device 1 (step S71). The waveform comparing unit 26 performs waveform comparison for comparing the phase of the received waveform with the phase of the eye mask pattern on the basis of the test pattern received from the communication device 1 (step S72). Subsequently, it is determined whether or not the received waveform appears in one of the first area A1, the second area A2, and the third area A3 (step S73).

When the received waveform appears in one of the first area A1 to the third area A3, third correction instruction data is transmitted to the communication device 1 so as to increase the EN value by one step (step S74).

When the received waveform appears in none of the first area A1 to the third area A3, storage instruction data is transmitted so as to temporarily store the current EN value (step S75). Next, fourth correction instruction data is transmitted to the communication device 1 so as to increase the EN value of the driver 11 of the communication device 1 by one step (step S76). Next, a test pattern is received from the communication device 1 (step S77). Subsequently, the waveform comparing unit 26 compares the received waveform with the eye mask pattern on the basis of the test pattern received from the communication device 1 (step S78). It is determined whether or not the received waveform appears in one of the first area A1 to the third area A3 (step S79).

When the received waveform appears in one of the first area A1 to the third area A3, optimum value setting instruction data is transmitted to the communication device 1 (step S80). Then, the processing of step S81 is executed. When the received waveform appears in none of the first area A1 to the third area A3, the processing of step S76 is executed.

Figure 20:
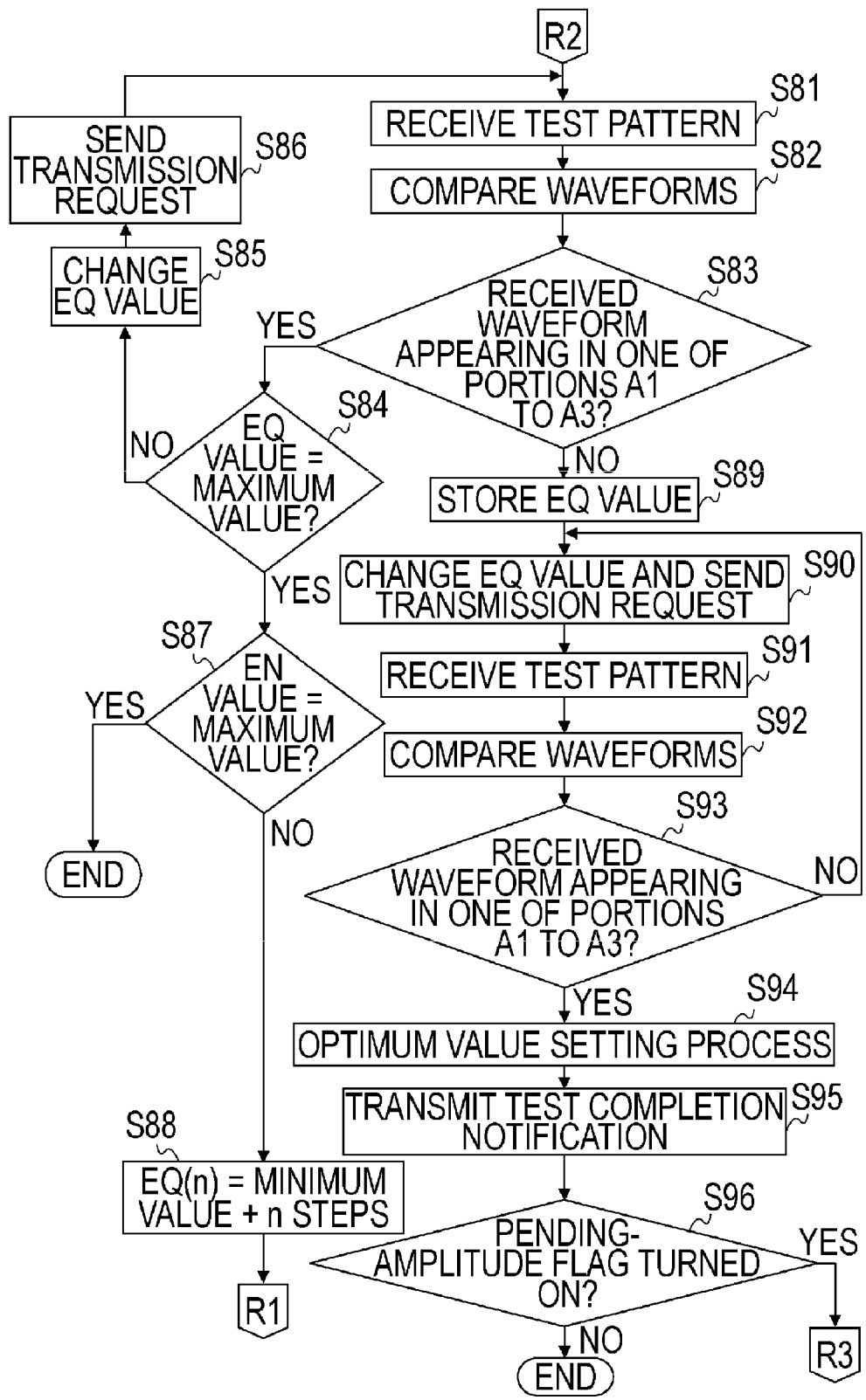
FIG. 20 is a flowchart illustrating a third portion of the flow of the reception process.

FIG. 20 illustrates a third portion of the flow of the reception process. The communication device 2 performs equalizer processing for the driver 11 of the communication device 1.

First, the communication device 2 receives a test pattern from the communication device 1 (step S81). Then, the waveform comparing unit 26 compares the received waveform with the eye mask pattern on the basis of the test pattern received from the communication device 1 (step S82). It is determined whether or not the received waveform appears in one of the first area A1 to the third area A3 (step S83).

When the received waveform appears in one of the first area A1 to the third area A3, it is determined whether or not the EQ value set in the communication device 2 is a maximum value (step S84). When the EQ value is not a maximum value, the EQ value is increased by one step (step S85). Next, a request for transmitting a test pattern is sent to the communication device 1 (step S86).

When it is determined in step S84 that the EQ value is a maximum value, it is determined whether or not the EN value set in the communication device 2 is a maximum value (step S87). When the set EN value is a maximum value, the process ends.

When the set EN value is not a maximum value, the EQ value is changed to reset the EN value (step S88). The EQ value is set to a value that is determined by increasing the minimum value F by n steps (i.e., EQ (n)=minimum value+n), where n is an integer. Therefore, in the first time, the EQ value is set to the value obtained by increasing the minimum value F by one step. Then, the process proceeds to step S71. In the second and subsequent times, the EQ value is further increased by one step. Then, the process proceeds to step S71.

When it is determined in step S83 that the received waveform appears in none of the first area A1 to the third area A3, the current EQ value, for example, the value represented by F+m, is stored in the reception setting storage unit 24 (step S89). Then, the EQ value is increased by one step, the changed EQ value is set in the equalizer 22, and transmission request data for transmitting a test pattern is transmitted to the communication device 1 (step S90). Next, a test pattern is received from the communication device 1 (step S91). The waveform comparing unit 26 compares the received waveform with the eye mask pattern (step S92). It is determined whether or not the received waveform appears in one of the first area A1 to the third area A3 (step S93).

When the received waveform appears in one of the first area A1 to the third area A3, the process of setting the EQ value to an optimum value is performed. Specifically, the current EQ value, for example, the value represented by F+n, is stored in the reception setting storage unit 24, and the value represented by ((F+m)+(F+n))/2 is stored in the reception setting storage unit 24 and is also set in the equalizer 22 (step S94). Next, test completion notification data is transmitted to the communication device 1 (step S95). Then, it is determined whether or not the pending-amplitude flag is turned on (step S96).

When the pending-amplitude flag is turned off, the setting process ends. When the pending-amplitude flag is turned on, the processing of step S57 is executed.

In this manner, the characteristics of the amplitude value and EN value of the driver 11, and the EQ value of the receiving unit 21 can be set to optimum values without increasing the number of steps for device evaluation or the like, resulting in improved transmission quality. Furthermore, the waveform obtained as a result of compensating for the received waveform can be checked using the receiving device, thus facilitating the development of a transmission circuit chip for each of various systems.

The transmission quality parameters are automatically adjusted upon detection of the following events.

(1) Each set value is automatically adjusted in the initial state after the communication system 61 has been powered on. (2) Each set value is automatically adjusted in the initial state after hot plug-in of the communication device 1 or 2. For example, when an information processing apparatus including the communication device 1 is in the powered-on state and is connected to an information processing apparatus including the communication device 2, each set value may be automatically adjusted. Alternatively, when the communication device 1 or 2 is connected to an information processing apparatus that is in the powered-on state, each set value may be automatically adjusted. (3) Each set value is automatically adjusted when the temperature of the communication system 61 exceeds a predetermined threshold while the temperature of the communication system 61 is monitored. The adjustment is performed in order to allow the communication system 61 to be used at optimum parameters regardless of the temperature environment. Accordingly, each of the communication devices 1 and 2 is provided with a temperature monitoring unit (not illustrated) for monitoring the temperature of the communication system 61. (4) Each set value is automatically adjusted when a transmission error has occurred in the communication system 61. The parameters are optimized in order to prevent or reduce the occurrence of transmission errors in the communication system 61. (5) During the inspection before shipment of the communication system 61, optimum parameters (amplitude, emphasis, and equalizer) are determined and are stored in the transmission setting storage unit 13 and the reception setting storage unit 24. Therefore, the communication system 61 can later be used at the optimum values stored in the respective setting storage units immediately when the power is turned on after shipment of the product.

According to the embodiment, the transmission characteristics of the amplitude value and emphasis value of a driver can be set to optimum values without increasing the number of steps for device evaluation or the like, resulting in improved transmission quality. In addition, the equalizer value of a receiving unit can be set to an optimum value, resulting in improved transmission quality. Furthermore, an image or the like that is formed by superposing a received waveform on an eye mask pattern can be visually observed using a receiving device, thus facilitating the checking of transmission quality depending on the system.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A communication device communicating with another communication device, comprising:
   a storage unit that stores a predetermined eye mask pattern indicating a receivable range;
   a receiving unit that receives data from the other communication device;
   a waveform comparing unit to compare a waveform of the received data with the eye mask pattern to generate comparison result data, the waveform comparing unit including:
      a comparison unit that compares the waveform of the received data with a plurality of predetermined threshold voltages in a chronological order,
      an obtaining unit that obtains the waveform of the received data from a comparison result of the comparison unit, a processing unit that superposes the waveform of the received data on the eye mask pattern, a determination unit that determines whether the eye mask pattern has a portion that overlaps the obtained waveform of the received data as a result of superposition performed by the processing unit, and a generation unit that generates the comparison result data indicating a determination result obtained by the determination unit; and a transmission unit to transmit the comparison result data to the other communication device.

2. The communication device according to claim 1, comprising:

an equalizer that compensates a phase or amplitude characteristic of the waveform of the received data on the basis of a set value of the equalizer, and wherein the waveform comparing unit compares an output waveform of the equalizer with the eye mask pattern and adjusts the set value of the equalizer when the waveform has a portion that overlaps the eye mask pattern.

3. The communication device according to claim 1, comprising an output unit coupled to the storage unit that outputs data obtained by superposing the waveform of the received data on the eye mask pattern.

4. The communication device according to claim 1, wherein the comparison unit includes a switch unit having a plurality of switches, the switch unit being configured to switch the plurality of switches to compare the waveform of the received data with the plurality of threshold voltages in a chronological order and configured to output comparison results.

5. The communication device according to claim 1, wherein the generation unit generates instruction data to change a transmission output characteristic of the other communication device when a result determined by the determination unit indicates that the eye mask pattern has a portion that overlaps the waveform of the received data.

6. A communication system comprising:

first and second communication devices, serial data being transmitted and received between the first communication device and the second communication device via a transmission line, and the second communication device including:
a storage unit that stores a predetermined eye mask pattern indicating a receivable range,
a receiving unit that receives data from the first communication device,
a waveform comparing unit that compares a waveform of the received data with the eye mask pattern to generate comparison result data, the waveform comparing unit including:
a comparison unit that compares the waveform of the received data with a plurality of predetermined threshold voltages in a chronological order,
an obtaining unit that obtains the waveform of the received data from a comparison result of the comparison unit,
a processing unit that superposes the obtained waveform of the received data on the eye mask pattern,
a determination unit that determines whether the eye mask pattern has a portion that overlaps the obtained waveform of the received data as a result of superposition performed by the processing unit, and
a generation unit that generates the comparison result data indicating a determination result obtained by the determination unit, and
a transmission unit that transmits the comparison result data to the first communication device, and
the first communication device including:
a transmission unit that transmits the data to the second communication device,
a receiving unit that receives the comparison result data from the second communication device, and
a setting unit that sets a transmission output setting value of the transmission unit of the first communication device on a basis of the received comparison result data.

7. The communication system according to claim 6, wherein the setting unit changes an amplitude value or an emphasis value of the transmission unit of the first communication device on the basis of the comparison result data, the emphasis value indicating a degree of emphasis in a high-frequency range of a transmission waveform.

8. The communication system according to claim 7, wherein the second communication device includes an equalizer that compensates a phase or amplitude characteristic of the waveform of the received data on the basis of a set value of the equalizer, and wherein the waveform comparing unit compares an output waveform of the equalizer with the eye mask pattern and adjusts the set value of the equalizer when the waveform has a portion that overlaps the eye mask pattern.

* * * * *